(12) United States Patent
Pampaloni et al.

(10) Patent No.: US 11,299,505 B2
(45) Date of Patent: Apr. 12, 2022

(54) BIS-IMINE TITANIUM COMPLEX, CATALYTIC SYSTEM COMPRISING SAID BIS-IMINE TITANIUM COMPLEX AND PROCESS FOR THE (CO)POLYMERTZATION OF CONJUGATED DIENES

(71) Applicant: Versalis S.P.A., San Donato Milanese (IT)

(72) Inventors: Guido Pampaloni, Pontedera (IT); Giovanni Ricci, Parma (IT); Anna Sommazzi, Novara (IT); Massimo Guelfi, Pietrasanta (IT); Giuseppe Leone, Milan (IT); Francesco Masi, Sant'angelo Lodigiano (IT)

(73) Assignee: Versalis S.P.A., San Donato Milanese (IT)

( * ) Notice: Subject to any disclaimer, the term of this patent is extended or adjusted under 35 U.S.C. 154(b) by 0 days.

(21) Appl. No.: 16/649,131

(22) PCT Filed: Sep. 28, 2018

(86) PCT No.: PCT/IB2018/057552
§ 371 (c)(1),
(2) Date: Mar. 19, 2020

(87) PCT Pub. No.: WO2019/064253
PCT Pub. Date: Apr. 4, 2019

(65) Prior Publication Data
US 2020/0247832 A1    Aug. 6, 2020

(30) Foreign Application Priority Data

Sep. 29, 2017   (IT) .......................... 102017000109176

(51) Int. Cl.
*C07F 7/28*    (2006.01)
*C08F 4/64*    (2006.01)
(Continued)

(52) U.S. Cl.
CPC ............ *C07F 7/28* (2013.01); *C08F 4/64013* (2013.01); *C08F 4/6428* (2013.01); *C08F 36/06* (2013.01)

(58) Field of Classification Search
CPC ...... C07F 7/28; C08F 4/64013; C08F 4/6428; C08F 36/06
See application file for complete search history.

(56) References Cited

U.S. PATENT DOCUMENTS 5,128,295 A   7/1992   Porri et al.
5,258,475 A   11/1993  Kissin
(Continued)

FOREIGN PATENT DOCUMENTS

CA   3076870 A1   4/2019
EP   277003      8/1988
(Continued)

OTHER PUBLICATIONS

"Periodic Table of the Elements" refers to the "IUPAC Periodic Table of the Elements", version dated Jun. 22, 2007, available on the following website: www.iupac.org/fileadmin/user_upload/news/IUPAC_Periodic_Table-1Jun12.pdf.
(Continued)

*Primary Examiner* — Catherine S Branch
(74) *Attorney, Agent, or Firm* — Praedcere Law

(57) ABSTRACT

Bis-imine titanium complex having general formula (I): wherein: $R_1$ and $R_2$, mutually identical or different, represent a hydrogen atom; or are selected from linear or branched, optionally halogenated, $C_1$-$C_{20}$ alkyl groups, preferably
(Continued)

$C_1$-$C_{15}$, optionally substituted cycloalkyl groups; $R_3$ and $R_4$, mutually identical or different, represent a hydrogen atom; or are selected from linear or branched, optionally halogenated, $C_1$-$C_{20}$ alkyl groups, preferably $C_1$-$C_{15}$, optionally substituted cycloalkyl groups, optionally substituted aryl groups; $X_1$, $X_2$, $X_3$ and $X_4$, mutually identical or different, represent a halogen atom such as chlorine, bromine, iodine; or are selected from linear or branched $C_1$-$C_{20}$ alkyl groups, preferably $C_1$-$C_{15}$, —$OCOR_5$ groups or —$OR_5$ groups wherein $R_5$ is selected from linear or branched $C_1$-$C_{20}$ alkyl groups, preferably $C_1$-$C_{15}$; or represent an acetylacetonate group (acac); provided that when $R_1$ and $R_2$ represent a methyl group and $X_1$, $X_2$, $X_3$ and $X_4$ represent a chlorine atom, $R_3$ and $R_4$ are different from 2,6-di-isopropylphenyl.

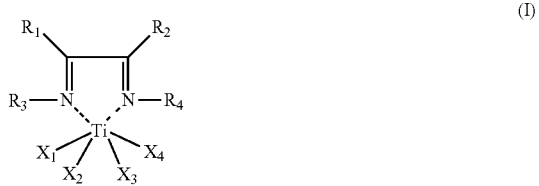

(I)

13 Claims, 14 Drawing Sheets

(51) Int. Cl.
   *C08F 4/642*  (2006.01)
   *C08F 36/06*  (2006.01)

(56) References Cited

U.S. PATENT DOCUMENTS

| | | |
|---|---|---|
| 5,866,663 A | 2/1999 | Brookhart et al. |
| 6,897,272 B1 | 5/2005 | Brookhart et al. |
| 2020/0247832 A1 | 8/2020 | Pampaloni et al. |

FOREIGN PATENT DOCUMENTS

| | | |
|---|---|---|
| EP | 418044 | 3/1991 |
| EP | 421659 | 4/1991 |
| EP | 427697 | 5/1991 |
| EP | 495375 | 7/1992 |
| EP | 520732 | 12/1992 |
| EP | 2756011 B1 | 2/2019 |
| IN | 202017014459 A1 | 8/2002 |
| RU | 231565901 C1 | 1/2008 |
| RU | 2616005 C2 | 4/2017 |
| WO | WO92/00333 | 1/1992 |
| WO | WO92/05208 | 4/1992 |
| WO | WO96/23010 A2 | 8/1996 |
| WO | WO2011061151 | 5/2011 |
| WO | WO2012/110227 A1 | 8/2012 |
| WO | WO2013/064235 A1 | 5/2013 |
| WO | WO2017017203 | 2/2017 |
| WO | WO2019064253 A1 | 4/2019 |

OTHER PUBLICATIONS

Beck W. et al., "Chemical Reviews" (1988), vol. 88, p. 1405-1421.
Strauss S. H., "Chemical Reviews" (1993), vol. 93, p. 927-942.
Manzer L. E. et al, in "Inorganic Syntheses" (1982), t. 2, vol. 21, p. 135-140.
Mochel, V. D., in "Journal of Polymer Science Part A-1: Polymer Chemistry" (1972), vol. 10, Issue 4, p. 1009-1018.
International Search Report and Written Opinion for PCT/IB2018/0057552, dated Jan. 16, 2019, 11 pages.
Porri L. et al., "Comprehensive Polymer Science" (1989), Eastmond G. C. et al. Eds., Pergamon Press, Oxford, UK, vol. 4, Part II, p. 53-108.
Horne S. E. et al. in "Industrial & Engineering Chemistry" (1956), vol. 48(4), p. 784-791.
Natta G. et al. in "Chemical Abstract" (1959), vol. 53, p. 3756.
Cucinella S. et al., "Journal of Macromolecular Science: Part A—Chemistry" (1970), vol. 4, Issue 7, p. 1549-1561.
Natta G. et al., "Chemical Abstract" (1958), vol. 52, p. 5032.
Mazzei S. et al., "La Chimica e l'Industria" (1963), vol. 45, p. 528.
Mazzei S. et al., "Chemical Abstract" (1963), vol. 59, p. 4043.
Oliva L. et al, "Die Makromoleculare Chemie, Rapid Communications" (1990), vol. 11(11), p. 519-524.
Ricci G. et al., "Journal of Organometallic Chemistry" (1993), vol. 451, Issues 1-2, p. 67-72.
Ricci G. et al., "Macromolecular Rapid Communications" (1996), vol. 17, Issue 11, p. 781-785.
Porri L. et al., "Metalorganic Catalyst for Synthesis and Polymerization" (1999), Kaminsky W. Ed., Springer-Verlag Berlin Heidelberg, p. 519-530.
Porri L. et al., "Metallocene-Based Polyolefins" (2000), Scheirs J. et al. Eds., John Wiley & Sons Ltd., p. 115-141.
Ricci G. et al., "Macromolecules" (2001), vol. 34, p. 5766-5769.
Ricci G. et al., "Polymer Bulletin" (2002), vol. 48, p. 25-31.
Bazzini C. et al., "Macromolecular Rapid Communications" (2002), vol. 23, Issue 15, p. 922-927.
Ricci G. et al., "Journal of Molecular Catalysis A: Chemical" (2003),vol. 204-205, p. 287-293.
Bazzini C. et al., "Polymer" (2004), vol. 45, p. 2871-2875.
Pirozzi B. et al., "Macromolecular Chemistry and Physics" (2004), vol. 205, Issue 10, p. 1343-1350.
Ricci G. et al., "Organometallics" (2004), vol. 23(15), p. 3727-3732.
Ricci G. et al., "Journal of Molecular Catalysis A: Chemical" (2005), vol. 226, p. 235-241.
Ricci G. et al., "Macromolecules" (2005), vol. 38, p. 1064-11070.
Ricci G. et al., "Journal of Organometallic Chemistry" (2005), vol. 690, p. 1845-1854.
Ricci G. et al., "Journal of Molecular Catalysis A: Chemical" (2007), vol. 267, Issues 1-2, p. 102-107.
Ricci G. et al., "Macromolecular Symposia" (2008), vol. 260, Issue 1, p. 172-178.
Ricci G. et al., "Macromolecules" (2005), vol. 38, p. 8345-8352.
Ricci G. et al., "Journal of Polymer Science Part A: Polymer Chemistry" (2007), vol. 45, Issue 22, p. 5339-5353.
Ricci G. et al., "Macromolecules" (2007), vol. 40, p. 7238-7243.
Pirozzi B. et al., "Macromolecules" (2007), vol. 40, p. 8962-8968.
Ricci G. et al., "Macromolecules" (2009), vol. 42, p. 3048-3056.
Porri L., "Structural Order in Polymers" (1981), Ciardelli F. et al. Eds., Pergamon Press, Oxford, UK, p. 51.
Porri L. et al., "Progress in Polymer Science" (1991), vol. 16, p. 405-441.
Porri L. et al., "Die Makromolekulare Chemie. Macromolecular Symposia" (1991), vol. 48-49, Issue 1, p. 239-252.
Porri L. et al., "Polymer Science, Ser. A" (1994), vol. 36, p. 1421-1432.
Porri L. et al, "Macromolecular Symposia" (2002), vol. 178, Issue 1, p. 55-68.
van der Poel H. et al., in "Synthetic Communication" (1978), vol. 8, p. 305.
Svoboda M. et al., in "Zeitschrift fuer Naturfoschung" (1981), Teil B, p. 814-822.
Dieck H. et al., in "Zeitschrift fuer Naturfoschung" (1981), Teil B, p. 823-832.
Dieck H. et al., in "Zeitschrift fuer Naturfoschung" (1975), Teil B, p. 922-925.
Svoboda M. et al., in "Journal of Organometallic Chemistry" (1980), vol. 191, p. 321-328.
Kliegman J. M. et al., in "Tetrahedron" (1970), vol. 26, p. 2555-2560.
Kliegman J. M. et al., in "The Journal of Organic Chemistry" (1970), vol. 35(9), p. 3140-3143.

(56) References Cited

OTHER PUBLICATIONS

Barney V. C. et al., in "Journal of Chemical Society" (1953), p. 3610-3612.
Horner L. et al., in "Chemische Berichte" (1957), vol. 90, p. 2184-2189.
Carson J. F. et al., in "Journal of the American Chemical Society" (1953), vol. 75, p. 4337-4338.
Johnson L. K. et al., in "Journal of the American Chemical Society" (1995), vol. 117, p. 6414-6415.
van Koten G. et al., in "Advances in Organometallic Chemistry" (1982), vol. 21, p. 151-239.
Search Report and Written Opinion issued for Iranian Patent Application 139950140003000025, 4 pages.
Office Action issued by the Indonesian Patent Office for Indonesian patent application P00202003088, dated Sep. 16, 2021, 9 pages. Translation in English is provided.
Office Action issued by the Russian patent office (Rospatent) for patent application 2020112805, dated Nov. 19, 2021, 6 pages. Translation in English provided.
Search Report dated Oct. 18, 2021, 2 pages.

BIS-IMINE TITANIUM COMPLEX, CATALYTIC SYSTEM COMPRISING SAID BIS-IMINE TITANIUM COMPLEX AND PROCESS FOR THE (CO)POLYMERTZATION OF CONJUGATED DIENES

The present invention relates to a bis-imine titanium complex.

More particularly, the present invention relates to a bis-imine titanium complex and its use in a catalytic system for the (co)polymerization of conjugated dienes.

The present invention also relates to a catalytic system for the (co)polymerization of conjugated dienes comprising said bis-imine titanium complex.

Furthermore, the present invention relates to a (co)polymerization process of conjugated dienes, in particular, a process for the polymerization of 1-3-butadiene, characterized in that it uses said catalytic system.

It is known that the stereospecific (co)polymerization of conjugated dienes is a very important process in the chemical industry in order to obtain products that are among the most widely used rubbers.

Stereospecific polymerization of conjugated dienes with catalytic systems based on transition metals began in 1954, straight after the first results obtained in the polymerization of propylene as reported, for example, in Porri L. et al, "*Comprehensive Polymer Science*" (1989), Eastmond G. C. et al Eds., Pergamon Press, Oxford, UK, Vol. 4, Part II, pg. 53-108. The first catalytic systems used were obtained by combining titanium tetrachloride ($TiCl_4$) or titanium(III) chloride ($TiCl_3$) with aluminum-alkyls, or catalytic systems previously used for the polymerization of ethylene or propylene.

The first stereoregular diene polymer synthesized was polyisoprene having a very similar structure to that of natural rubber (i.e. 1,4-cis structure) described by Home S. E. et al in "*Industrial & Engineering Chemistry*" (1956), Vol. 48(4), pg. 784-791, immediately followed by polyisoprene with an analogous structure to that of gutta-percha (i.e. 1,4-trans structure) described by Natta G. et al in "*Chemical Abstract*" (1959), Vol. 53, pg. 3756 and in Italian patent application IT 536631.

In relation to polybutadiene, the titanium(IV)chloride/trialkylaluminum [$TiCl_4$/$Al(R)_3$ catalytic system wherein R may be, for example, methyl, ethyl, iso-butyl, cyclohexyl], was the first catalyst used for the polymerization of 1,3-butadiene, as described, for example, in: Porri L. et al, "*Comprehensive Polymer Science*" (1989), Eastmond G. C. et al Eds., Pergamon Press, Oxford, UK, Vol. 4, Part II, pg. 53-108, reported above; Home S. E. et al, "*Industrial Engineering Chemistry*" (1956), Vol. 48, pg. 784-791, reported above. According to the aluminum (Al)/titanium (Ti) molar ratio, polybutadienes can be obtained prevalently with a 1,4-cis structure (i.e. content of 1,4-cis units equal to 65%-70%), or polybutadienes with a mixed 1,4-cis/1,4-trans structure.

In fact, catalytic systems based on titanium were the first to be used for the synthesis of polybutadiene with a high content of 1,4-cis units, and represented the basis for the development of the processes used industrially for said synthesis both in Europe and the USA. Nowadays, more active and stereospecific catalytic systems are available, based on other metals, such as cobalt (Co), nickel (Ni) and neodymium (Nd).

However, by appropriately changing the catalytic formulation, catalytic systems based on titanium are able to provide polybutadiene with a 1,2 structure and 1,4-trans structure. For example, the α-titanium(III)chloride/triethylaluminum (α-$TiCl_3$/$AlEt_3$) catalytic system was the first catalyst used for the preparation of polybutadiene 1,4-trans as described, for example, in Porri L. et al, "*Comprehensive Polymer Science*" (1989), Eastmond G. C. et al Eds., Pergamon Press, Oxford, UK, Vol. 4, Part II, pg. 53-108, reported above; Natta G. et al, "*Chemical Abstract*" (1959), Vol. 53, pg. 3756 and in Italian patent application IT 536631; reported above. Other titanium based catalytic systems are reported, for example, in: Cucinella S. et al, "*Journal of Macromolecular Science: Part A—Chemistry*" (1970), Vol. 4, Issue 7, pg. 1549-1561; Natta G. et al, "*Chemical Abstract*" (1958), Vol. 52, pg. 5032 and in Italian patent application IT 538453; Mazzei S. et al, "*La Chimica e l'Industria*" (1963), Vol. 45, pg. 528 and in "*Chemical Abstract*" (1963), Vol. 59, pg. 4043; Oliva L. et al, "*Die Makromoleculare Chemie, Rapid Communications*" (1990), Vol. 11(11), pg. 519-524; Ricci G. et al, "*Journal of Organometallic Chemistry*" (1993), Vol. 451, Issues 1-2, pg. 67-72; Ricci G. et al, "*Macromolecular Rapid Communications*" (1996), Vol. 17, Issue 11, pg. 781-785; Porri L. et al, "*Metalorganic Catalyst for Synthesis and Polymerization*" (1999), Kaminsky W. Ed., Springer-Verlag Berlin Heidelberg, pg. 519-530; Porri L. et al, "*Metallocene-Based Polyolefins*" (2000), Scheirs J. et al Eds., John Wiley & Sons Ltd., pg. 115-141.

Over recent years, in the wake of what happened in the case of mono-olefins, a new generation of catalysts has been introduced, based on transition metal complexes, in particular, chromium (Cr), iron (Fe) and cobalt (Co), with ligands containing donor atoms such as phosphorus (P), nitrogen (N), oxygen (O) (for example, mono- and bi-dentate phosphines, bis-imine, imino pyridine, ketoimine), which have been used in combination with methylaluminoxane (MAO) for providing catalytic systems that have been shown to be particularly active and able to provide diene polymers with a controlled microstructure (i.e. 1,4-cis; 1,4-trans; 1,2; mixed structure 1,4-cis/1,2 with a variable content of 1,2 units). Further details on said catalytic systems can be found, for example, in: Ricci G. et al, "*Macromolecules*" (2001), Vol. 34, pg. 5766-5769; Ricci G. et al, "*Polymer Bulletin*" (2002), Vol. 48, pg. 25-31; Bazzini C. et al, "*Macromolecular Rapid Communications*" (2002), Vol. 23, Issue 15, pg. 922-927; Ricci G. et al, "*Journal of Molecular Catalysis A: Chemical*" (2003), Vol. 204-205, pg. 287-293; Bazzini C. et al, "Polymer" (2004), Vol. 45, pg. 2871-2875; Pirozzi B. et al, "*Macromolecular Chemistry and Physics*" (2004), Vol. 205, Issue 10, pg. 1343-1350; Ricci G. et al, "*Organometallics*" (2004), Vol. 23(15), pg. 3727-3732; Ricci G. et al, "*Journal of Molecular Catalysis A: Chemical*" (2005), Vol. 226, pg. 235-241; Ricci G. et al, "*Macromolecules*" (2005), Vol. 38, pg. 1064-11070; Ricci G. et al, "*Journal of Organometallic Chemistry*" (2005), Vol. 690, pg. 1845-1854; Ricci G. et al, "*Journal of Molecular Catalysis A: Chemical*" (2007), Vol. 267, Issues 1-2, pg. 102-107; Ricci G. et al, "*Macromolecular Symposia*" (2008), Vol. 260, Issue 1, pg. 172-178. The same catalytic systems also have allowed to synthesize new stereoregular diene polymers starting from different monomers such as isoprene, 1,3-pentadiene, 1,3-hexadiene, 3-methyl-1,3-pentadiene, 1,3-heptadiene, 1,3-octadiene and 5-methyl-1,3-hexadiene as reported, for example, in: Ricci G. et al, "*Macromolecules*" (2005), Vol. 38, pg. 8345-8352; Ricci G. et al, "*Journal of Polymer Science Part A: Polymer Chemistry*" (2007), Vol. 45, Issue 22, pg. 5339-5353; Ricci G. et al, "*Macromolecules*" (2007), Vol. 40, pg. 7238-7243; Pirozzi B. et al, "*Macromolecules*"

(2007), Vol. 40, pg. 8962-8968; Ricci G. et al, "*Macromolecules*" (2009), Vol. 42, pg. 3048-3056. This enabled new links to be established between the structure of the catalyst, the structure of the monomer and the microstructure of the polymer, at the same time enabling the level of knowledge to be increased on the polymerization mechanism of conjugated dienes already known in the prior art and reported, for example, in: Porri L. et al, "*Comprehensive Polymer Science*" (1989), Eastmond G. C. et al Eds., Pergamon Press, Oxford, UK, Vol. 4, Part II, pg. 53-108, reported above; Porri L., "*Structural Order in Polymers*" (1981), Ciardelli F. et al Eds., Pergamon Press, Oxford, UK, pg. 51; Porri L. et al, "*Progress in Polymer Science*" (1991), Vol. 16, pg. 405-441; Porri L. et al, "*Die Makromolekulare Chemie. Macromolecular Symposia*" (1991), Vol. 48-49, Issue 1, pg. 239-252; Porri L. et al, "*Polymer Science, Ser. A*" (1994), Vol. 36, pg. 1421-1432; Porri L. et al, "*Macromolecular Symposia*" (2002), Vol. 178, Issue 1, pg. 55-68.

Nitrogen titanium complexes with ligands, neutral or anionic, of a pyridyl-amine or keto-amine nature, able to provide (co)polymers of conjugated dienes, such as, polybutadiene with a prevalent 1,4-cis unit content (i.e. 1,4-cis unit content 80%), or polyisoprene with a variable 1,4-cis/3,4 unit content (i.e. 1,4-cis unit content ranging from 30% to 60% and a 3,4 unit content ranging from 40% to 70%) are described, for example, in international patent application WO 2017/017203 in the name of the Applicant.

Since (co)polymers of conjugated dienes, in particular polybutadiene with a prevalent 1,4-cis unit content (i.e. 1,4-cis unit content 60%) can be advantageously used for producing tires, in particular for tire treads, the study of new catalytic systems able to provide said (co)polymers is still of great interest.

The Applicant set out to solve the problems of finding a new bis-imine titanium complex that can be used in a catalytic system able to provide (co)polymers of conjugated dienes, such as polybutadiene with a prevalent 1,4-cis unit content, (i.e. 1,4-cis unit content 60%).

The Applicant has now found a new bis-imine titanium complex having general formula (I) defined below, able to provide (co)polymers of conjugated dienes, such as polybutadiene with a prevalent 1,4-cis unit content, (i.e. 1,4-cis unit content ≥60%).

Therefore, the subject matter of the present invention is a bis-imine titanium complex having general formula (I):

(I)

wherein:
$R_1$ and $R_2$, mutually identical or different, represent a hydrogen atom; or are selected from linear or branched, optionally halogenated, $C_1$-$C_{20}$ alkyl groups, preferably $C_1$-$C_{15}$, optionally substituted cycloalkyl groups;
$R_3$ and $R_4$, mutually identical or different, represent a hydrogen atom; or are selected from linear or branched, optionally halogenated, $C_1$-$C_{20}$ alkyl groups, preferably $C_1$-$C_{15}$, optionally substituted cycloalkyl groups, optionally substituted aryl groups;
$X_1$, $X_2$, $X_3$ and $X_4$, mutually identical or different, represent a halogen atom such as chlorine, bromine, iodine; or are selected from linear or branched $C_1$-$C_{20}$ alkyl groups, preferably $C_1$-$C_{15}$, —$OCOR_5$ groups or —$OR_5$ groups wherein $R_5$ is selected from linear or branched $C_1$-$C_{20}$ alkyl groups, preferably $C_1$-$C_{15}$; or represent an acetylacetonate group (acac);

provided that when $R_1$ and $R_2$ represent a methyl group and $X_1$, $X_2$, $X_3$ and $X_4$ represent a chlorine atom, $R_3$ and $R_4$ are different from 2,6-di-iso-propylphenyl.

For the purpose of the present description and of the following claims, the definitions of the numeric ranges always include the extremes unless specified otherwise.

For the purpose of the present description and of the following claims, the term "comprising" also includes the terms "which essentially consists of" or "which consists of".

For the purpose of the present description and of the following claims, the term "$C_1$-$C_{20}$ alkyl groups" means alkyl groups having from 1 to 20 carbon atoms, linear or branched. Specific examples of $C_1$-$C_{20}$ alkyl groups are: methyl, ethyl, n-propyl, iso-propyl, n-butyl, s-butyl, iso-butyl, tert-butyl, pentyl, hexyl, heptyl, octyl, n-nonyl, n-decyl, 2-butyloctyl, 5-methylhexyl, 4-ethylhexyl, 2-ethylheptyl, 2-ethylhexyl.

For the purpose of the present description and of the following claims, the term "optionally halogenated $C_1$-$C_{20}$ alkyl groups" means alkyl groups having from 1 to 20 carbon atoms, linear or branched, saturated or unsaturated, wherein at least one of the hydrogen atoms is substituted with a halogen atom, for example, fluorine, chlorine, bromine, preferably fluorine, chlorine. Specific examples of $C_1$-$C_{20}$ alkyl groups optionally containing heteroatoms are: fluoromethyl, difluoromethyl, trifluoromethyl, trichloromethyl, 2,2,2-trifluoroethyl, 2,2,2-trichloroethyl, 2,2,3,3-tetrafluoropropyl, 2,2,3,3,3-pentafluoropropyl, perfluoropentyl, perfluoroctyl, perfluorodecyl.

For the purpose of the present description and of the following claims, the term "cycloalkyl groups" means cycloalkyl groups having from 3 to 30 carbon atoms. Said cycloalkyl groups can be optionally substituted with one or more groups, mutually identical or different, selected from: halogen atoms, such as, fluorine, chlorine, bromine, preferably fluorine, chlorine; hydroxyl groups; $C_1$-$C_{12}$ alkyl groups; $C_1$-$C_{12}$ alkoxy groups, cyano groups; amino groups; nitro groups. Specific examples of cycloalkyl groups are: cyclopropyl, 2,2-difluorocyclopropyl, cyclobutyl, cyclopentyl, cyclohexyl, hexamethylcyclohexyl, pentamethylcyclopentyl, 2-cyclooctylethyl, methylcyclohexyl, methoxycyclohexyl, fluorocyclohexyl, phenylcyclohexyl.

For the purpose of the present description and of the following claims, the term "aryl groups" means carbocyclic aromatic groups. Said aryl groups can be optionally substituted with one or more groups, mutually identical or different, selected from: halogen atoms, such as, fluorine, chlorine, bromine; hydroxyl groups; $C_1$-$C_{12}$ alkyl groups; $C_1$-$C_{12}$ alkoxy groups; cyano groups; amino groups; nitro groups. Specific examples of aryl groups are: phenyl, methylphenyl, trimethylphenyl, methoxyphenyl, hydroxyphenyl, phenyloxyphenyl, fluorophenyl, pentafluorophenyl, chlorophenyl, bromophenyl, nitrophenyl, dimethylaminophenyl, naphthyl, phenylnaphthyl, phenanthrene, anthracene. In accordance with a preferred embodiment of the present invention, in said bis-imine titanium complex having general formula (I):

$R_1$ and $R_2$, mutually identical, are a hydrogen atom; or are selected from linear or branched $C_1$-$C_{20}$ alkyl groups, preferably are a methyl group;
$R_3$ and $R_4$, mutually identical, are selected from phenyl groups optionally substituted with linear or branched $C_1$-$C_{20}$ alkyl groups, preferably substituted with one or more methyl, ethyl, iso-propyl, tert-butyl groups;

$X_1$, $X_2$, $X_3$ and $X_4$, mutually identical, are a halogen atom such as, for example, chlorine, bromine, iodine, preferably chlorine.

The bis-imine titanium complex having general formula (I) can be considered, in accordance with the present invention, under any physical form such as, for example, the isolated and purified solid form, the form solvated with a suitable solvent, or the one supported on suitable organic or inorganic solids, preferably having a granular or powdered physical form.

The bis-imine titanium complex having general formula (I) is prepared starting from ligands known in the prior art.

Specific examples of ligands useful for the purpose of the present invention are those having the following formulae (L1)-(L8):

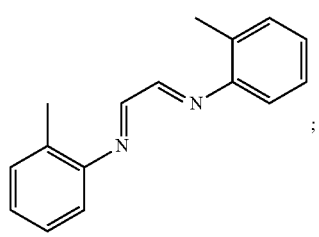

(L1)

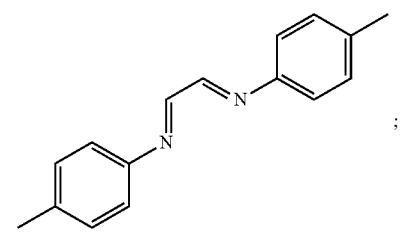

(L2)

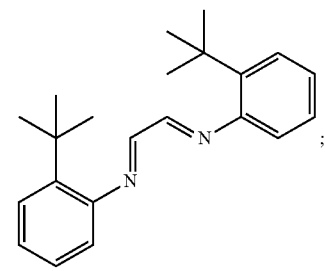

(L3)

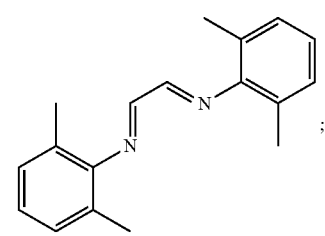

(L4)

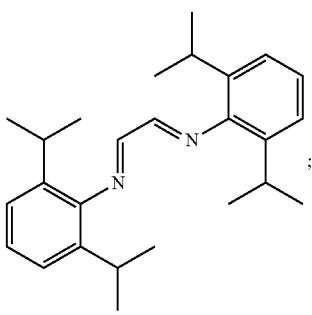

(L5)

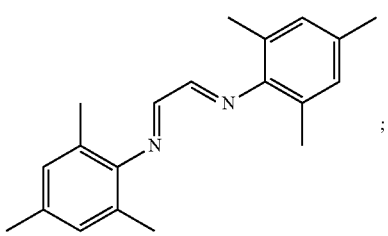

(L6)

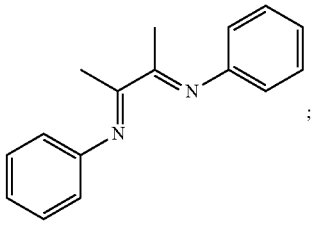

(L7)

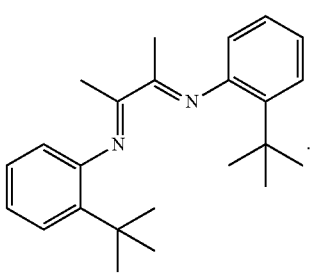

(L8)

Said ligands having formulae (L1)-(L8), can be prepared through processes known in the prior art. For example, said ligands having formulae (L1)-(L8), can be prepared:

through condensation reactions between primary amines and diketones as described, for example, by: van der Poel H. et al, in "Synthetic Communication" (1978), Vol. 8, pg. 305; Svoboda M. et al, in "Zeitschrift fuer Naturfoschung" (1981), Teil B, pg. 814-822; Dieck H. et al, in "Zeitschrift fuer Naturfoschung" (1981), Teil B, pg. 823-832; Dieck H. et al, in "Zeitschrift fuer Naturfoschung" (1975), Teil B, pg. 922-925; Svoboda M. et al, in "Journal of Organometallic Chemistry" (1980), Vol. 191, pg. 321-328;

through condensation reactions between glyoxal and primary amines as described, for example, by: Kliegman J. M. et al, in "Tetrahedron" (1970), Vol. 26, pg. 2555-2560; Kliegman J. M. et al, in "The Journal of Organic Chemistry" (1970), Vol. 35(9), pg. 3140-3143; Barney V. C. et al, in "Journal of Chemical Society" (1953), pg. 3610-3612; Horner L. et al, in "Chemische Berichte" (1957), Vol. 90, pg. 2184-2189; Carson J. F. et al, in "Journal of the American Chemical Society" (1953), Vol. 75, pg. 4337-4338;

through condensation reactions between primary amines and α-ketoaldehydes as described, for example, by: van der Poel H. et al, in "*Synthetic Communication*" (1978), Vol. 8, pg. 305; Svoboda M. et al, in "*Zeitschrift fuer Naturfoschung*" (1981), Teil B, pg. 814-822; Dieck H. et al, in "*Zeitschrift fuer Naturfoschung*" (1981), Teil B, pg. 823-832.

The bis-imine titanium complex having general formula (I) may be prepared according to procedures known in the prior art. For example, said bis-imine titanium complex may be prepared by reaction between titanium compounds having general formula Ti(X)$_4$ wherein X is a halogen atom, such as, for example, chlorine, bromine, iodine, preferably chlorine, as it is or complexed with ethers [for example, diethylether, tetrahydrofuran (THF), dimethoxyethane], with the ligands having formulae (L1)-(L8) reported above, in molar ratio ligand (L)/titanium (Ti) ranging from 1 to 1.5 operating, preferably, in the presence of at least one solvent which can be selected, for example, from: chlorinated solvents (for example, dichloromethane), ether solvents, [for example, tetrahydrofuran (THF)], alcoholic solvents (for example, butanol), hydrocarbon solvents (for example, toluene), or mixtures thereof, at ambient temperature or higher. The bis-imine titanium complex thus obtained can be subsequently recovered through methods of the prior art, for example, precipitation through a non-solvent (for example, pentane, heptane), followed by separation through filtration or decantation and optionally subsequent solubilization in a suitable solvent followed by crystallization at a low temperature.

For the purpose of the present description and of the following claims the expression "ambient temperature" means a temperature ranging from 20° C. to 25° C.

As mentioned above, the present invention also relates to a catalytic system for the (co)polymerization of conjugated dienes comprising said bis-imine titanium complex having general formula (I).

Therefore, the present invention also relates to a catalytic system for the (co)polymerization of conjugated dienes comprising:
(a) at least one bis-imine titanium complex having general formula (I);
(b) at least one co-catalyst selected from organic compounds of an element M' different from carbon, said element M' being selected from elements belonging to groups 2, 12, 13, or 14 of the Periodic Table of the Elements, preferably from: boron, aluminum, zinc, magnesium, gallium, tin, more preferably aluminum, boron.

In general, the formation of the catalytic system comprising the bis-imine titanium complex having general formula (I) and the co-catalyst (b), is preferably carried out in an inert liquid medium, more preferably in a hydrocarbon solvent. The choice of the bis-imine titanium complex having general formula (I) and of the co-catalyst (b), as well as the particular methodology used, may vary according to the molecular structures and to the desired result, according to what is similarly reported in relevant literature accessible to an expert skilled in the art for other transition metal complexes with imine ligands, as reported, for example, by Johnson L. K. et al, in "*Journal of the American Chemical Society*" (1995), Vol. 117, pg. 6414-6415, and by van Koten G. et al, in "*Advances in Organometallic Chemistry*" (1982), Vol. 21, pg. 151-239.

In accordance with a further preferred embodiment of the present invention, said co-catalyst (b) can be selected from (b$_1$) aluminum alkyls having general formula (II):

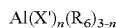

(II)

wherein X' represents a halogen atom such as, for example, chlorine, bromine, iodine, fluorine; R$_8$, mutually identical or different, represent a hydrogen atom, or are selected from linear or branched C$_1$-C$_{20}$ alkyl groups, cycloalkyl groups, aryl groups, said groups being optionally substituted with one or more silicon or germanium atoms; and n is an integer ranging from 0 to 2.

In accordance with a further preferred embodiment of the present invention, said co-catalyst (b) can be selected from (b$_2$) organo-oxygenated compounds of an element M' different from carbon belonging to groups 13 or 14 of the Periodic Table of the Elements, preferably organo-oxygenated compounds of aluminum, gallium, tin. Said organo-oxygenated compounds (b$_2$) can be defined as organic compounds of M', wherein the latter is bonded to at least one oxygen atom and at least one organic group comprising an alkyl group having from 1 to 6 carbon atoms, preferably methyl.

In accordance with a further preferred embodiment of the present invention, said co-catalyst (b) can be selected from (b$_3$) compounds or mixtures of organometallic compounds of an element M' different from carbon able to react with the bis-imine titanium complex having general formula (I) by extracting from it a δ-linked substituent X$_2$, X$_3$ or X$_4$, to form on the one hand at least one neutral compound and, on the other hand, an ionic compound consisting of a cation containing the metal (Ti) coordinated by the ligand, and a non-coordinating organic anion containing the metal M', whose negative charge is delocalized on a multicentric structure.

It is to be noted that for the purpose of the present invention and of the following claims, the term "Periodic Table of the Elements" refers to the "IUPAC Periodic Table of the Elements", version dated 22 Jun. 2007, available on the following website: www.iupac.org/fileadmin/user_upload/news/IUPAC_Periodic_Table-1Jun12.pdf.

Specific examples of aluminum alkyls having general formula (II) particularly useful for the purpose of the present invention are: tri-methyl-aluminum, tri-(2,3,3-tri-methyl-butyl)-aluminum, tri-(2,3-di-methyl-hexyl)-aluminum, tri-(2,3-di-methyl-butyl)-aluminum, tri-(2,3-di-methyl-pentyl)-aluminum, tri-(2,3-di-methyl-heptyl)-aluminum, tri-(2-methyl-3-ethyl-pentyl)-aluminum, tri-(2-methyl-3-ethyl-hexyl)-aluminum, tri-(2-methyl-3-ethyl-heptyl)-aluminum, tri-(2-methyl-3-propyl-hexyl)-aluminum, tri-ethyl-aluminum (TEA), tri-(2-ethyl-3-methyl-butyl)-aluminum, tri-(2-ethyl-3-methyl-pentyl)-aluminum, tri-(2,3-di-ethyl-pentyl-aluminum), tri-n-propyl-aluminum, tri-iso-propyl-aluminum, tri-(2-propyl-3-methyl-butyl)-aluminum, tri-(2-iso-propyl-3-methyl-butyl)-aluminum, tri-n-butyl-aluminum, tri-iso-butyl-aluminum (TIBA), tri-tert-butyl-aluminum, tri-(2-iso-butyl-3-methyl-pentyl)-aluminum, tri-(2,3,3-tri-methyl-pentyl)-aluminum, tri-(2,3,3-tri-methyl-hexyl)-aluminum, tri-(2-ethyl-3,3-di-methyl-butyl)-aluminum, tri-(2-ethyl-3,3-di-methyl-pentyl)-aluminum, tri-(2-iso-propyl-3,3-dimethyl-butyl)-aluminum, tri-(2-tri-methylsilyl-propyl)-aluminum, tri-2-methyl-3-phenyl-butyl)-aluminum, tri-(2-ethyl-3-phenyl-butyl)-aluminum, tri-(2,3-di-methyl-3-phenyl-butyl)-aluminum, tri-(2-phenyl-propyl)-aluminum, tri-[2-(4-fluoro-phenyl)-propyl]-aluminum, tri-[2-(4-chloro-phenyl)-propyl]-aluminum, tri-[2-(3-iso-propyl-phenyl-tri-(2-phenyl-butyl)-aluminum, tri-(3-methyl-2-phenyl-butyl)-aluminum, tri-(2-phenyl-pentyl)-aluminum, tri-[2-(penta-fluoro-phenyl)-propyl]-aluminum, tri-(2,2-diphenyl-ethyl]-aluminum, tri-(2-phenyl-methyl-propyl]-aluminum, tri-pentyl-aluminum, tri-hexyl-aluminum, tri-cyclohexyl-aluminum, tri-octyl-aluminum, di-ethyl-aluminum hydride, di-n-propyl-aluminum hydride, di-n-butyl-aluminum hydride, di-iso-butyl-aluminum hydride (DIBAH), di-hexyl-aluminum hydride, di-iso-hexyl-aluminum hydride, di-octyl-aluminum hydride, di-iso-octyl-aluminum hydride, ethyl-aluminum di-hydride, n-propyl-aluminum di-hydride, iso-butyl-aluminum di-hydride, di-ethyl-aluminum chloride (DEAC), mono-ethyl-aluminum dichloride (EADC), di-methyl-aluminum chloride, di-iso-butyl-aluminum chloride, iso-butyl-aluminum dichloride, ethyl-aluminum-sesquichloride (EASC), like the corresponding compounds wherein one of the hydrocarbon substituents is substituted by a hydrogen atom and those wherein one or two of the hydrocarbon substituents are substituted with an iso-butyl group. Tri-ethyl-aluminum (TEA), tri-n-propyl-aluminum, tri-iso-butyl-aluminum (TIBA), tri-hexyl-aluminum, di-iso-butyl-aluminum hydride (DIBAH), di-ethyl-aluminum chloride (DEAC), are particularly preferred.

Preferably, when used for the formation of a catalytic (co)polymerization system in accordance with the present invention, the aluminum alkyls having general formula (II) can be placed in contact with a bis-imine titanium complex having general formula (I), in proportions such that the molar ratio between the titanium contained in the bis-imine titanium complex having general formula (I) and the aluminum contained in the aluminum alkyls having general formula (II) can be ranging from 5 to 5000, preferably ranging from 10 to 1000. The sequence with which the bis-imine titanium complex having general formula (I) and the aluminum alkyl having general formula (II) are placed in contact with each other is not particularly critical.

Further details on aluminum alkyls having general formula (II) can be found in international patent application WO 2011/061151.

In accordance with a particularly preferred embodiment, said organo-oxygenated compounds ($b_2$) can be selected from the aluminoxanes having general formula (III):

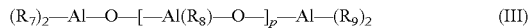

$(R_7)_2$—Al—O—[—Al($R_8$)—O—]$_p$—Al—($R_9$)$_2$ (III)

wherein $R_7$, $R_8$ and $R_9$, mutually identical or different, are a hydrogen atom, a halogen atom such as, for example, chlorine, bromine, iodine, fluorine; or are selected from linear or branched $C_1$-$C_{20}$ alkyl groups, cycloalkyl groups, aryl groups, said groups being optionally substituted with one or more silicon or germanium atoms; and p is an integer ranging from 0 to 1000.

As is known, aluminoxanes are compounds containing Al—O—Al bonds, with a variable O/Al ratio, obtainable according to processes known in the prior art such as, for example, by reaction, in controlled conditions, of an aluminum alkyl or an aluminum alkyl halogenide, with water, or with other compounds containing predetermined quantities of available water, such as, for example, in the case of the reaction of aluminum trimethyl with aluminum sulfate hexahydrate, copper sulfate pentahydrate, or iron sulfate pentahydrate.

Said aluminoxanes and, in particular, methylaluminoxane (MAO), are compounds that can be obtained through known organometallic chemical processes such as, for example, by adding trimethyl aluminum to an hexane suspension of aluminum sulfate hydrate. Preferably, when used for the formation of a catalytic (co)polymerization system in accordance with the present invention, the aluminoxanes having general formula (III) can be placed in contact with a bis-imine titanium complex having general formula (I), in proportions such that the molar ratio between the aluminum (Al) present in the aluminoxane having general formula (III) and the titanium present in the bis-imine titanium complex having general formula (I) is ranging from 10 to 10000, preferably ranging from 100 to 5000. The sequence with which the bis-imine titanium complex having general formula (I) and the aluminoxane having general formula (III) are placed in contact with each other is not particularly critical.

As well as the aforementioned preferred aluminoxanes having general formula (III), the definition of the compound ($b_2$) in accordance with the present invention also includes galloxanes wherein, in the general formula (III), gallium is contained in the place of aluminum and stannoxanes wherein, in the general formula (III), tin is contained in the place of aluminum, whose use as co-catalysts for the polymerization of olefins in the presence of metallocene complexes is known. Further details in relation to said galloxanes and stannoxanes can be found, for example, in the U.S. Pat. Nos. 5,128,295 and 5,258,475.

Specific examples of aluminoxanes having general formula (III) particularly useful for the purpose of the present invention are: methylaluminoxane (MAO), ethyl-aluminoxane, n-butyl-aluminoxane, tetra-iso-butyl-aluminoxane (TIBAO), tert-butyl-aluminoxane, tetra-(2,4,4-tri-methyl-pentyl)-aluminoxane (TIOAO), tetra-(2,3-di-methyl-butyl)-aluminoxane (TDMBAO), tetra-(2,3,3-tri-methyl-butyl)-aluminoxane (TTMBAO). Methylaluminoxane (MAO) is particularly preferred.

Further details on aluminoxanes having general formula Op can be found in international patent application WO 2011/061151.

In accordance with a preferred embodiment of the present invention, said compounds or mixtures of compounds ($b_3$) can be selected from organic compounds of aluminum and especially of boron, such as, for example, those represented by the following general formulae:

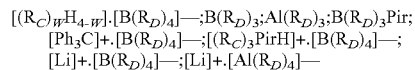

[($R_C$)$_w$H$_{4-w}$].[B($R_D$)$_4$]—;B($R_D$)$_3$;Al($R_D$)$_3$;B($R_D$)$_3$Pir;
[Ph$_3$C]+.[B($R_D$)$_4$]—;[($R_C$)$_3$PirH]+.[B($R_D$)$_4$]—;
[Li]+.[B($R_D$)$_4$]—;[Li]+.[Al($R_D$)$_4$]— wherein w is an integer ranging from 0 to 3, each $R_C$ group, independently represents an alkyl group or an aryl group having from 1 to 10 carbon atoms and each $R_D$ group represents, independently, a partially or totally, preferably totally-fluorinated, aryl group having from 6 to 20 carbon atoms, Pyr represents an optionally substituted pyrrole radical.

Preferably, when used for the formation of a catalytic (co)polymerization system in accordance with the present invention, the compounds or mixtures of compounds ($b_3$) can be placed in contact with a bis-imine titanium complex having general formula (I), in proportions such that the molar ratio between the metal (M') present in the compounds or mixtures of compounds ($b_3$) and the titanium present in the bis-imine titanium complex having general formula (I) is ranging from 0.1 to 15, preferably ranging from 0.5 to 10, more preferably ranging from 1 to 6. The sequence with which the bis-imine titanium complex having general formula (I) and the compound or mixture of compounds ($b_3$) are placed in contact with each other is not particularly critical.

Said compounds or mixtures of compounds ($b_3$), especially in the case wherein $X_1$, $X_2$, $X_3$ and $X_4$ in the bis-imine titanium complex having general formula (I) are different from alkyl, must be used in combination with an aluminoxane having general formula (III) such as, for example, methylaluminoxane (MAO), or, preferably, with an aluminum alkyl having general formula (II), more preferably a trialkylaluminum having from 1 to 8 carbon atoms in each alkyl residue such as, for example, tri-methyl-aluminum, tri-ethyl-aluminum, tri-iso-butylaluminum (TIBA).

Examples of the methodologies generally used for the formation of a catalytic (co)polymerization system in accordance with the present invention, in the case of using compounds or mixtures of compounds ($b_3$), are qualitatively depicted in the list reported below, which does not however limit the overall scope of the present invention:

($m_1$) contact of a bis-imine titanium iron complex having general formula (I) wherein at least one of the X substitutents $X_1$, $X_2$, $X_3$, and $X_4$ is an alkyl group, with at least one compound or a mixture of compounds ($b_3$) whose cation is able to react with said alkyl group to form a neutral compound, and whose anion is voluminous, non-coordinating and able to delocalize the negative charge;

($m_2$) reaction of a bis-imine titanium complex having general formula (I) with at least one aluminum alkyl having general formula (II), preferably a trialkylaluminum, used in excess molar ratio from 10/1 to 300/1, followed by the reaction with a strong Lewis acid, such as, for example, tris(pentafluorophenyl)boron [compound ($b_3$)], in almost stoichiometric quantities or in slight excess with respect to the titanium (Ti);

($m_3$) contact and reaction of a bis-imine titanium complex having general formula (I) with an excess molar ratio from 10/1 to 1000/1, preferably from 100/1 to 500/1 of at least a trialkylaluminum or an alkyl aluminum halogenide that can be represented with the formula $AlR_{10m}Z_{3-m}$ wherein $R_{10}$ is a linear or branched $C_1$-$C_8$ alkyl group, or a mixture thereof, Z is a halogen, preferably chlorine or bromine, and m is a decimal number ranging from 1 to 3, followed by the addition to the composition thus obtained of at least one compound or mixture of compounds ($b_3$) in quantities such that the ratio between said compound or mixture of compounds ($b_3$) or the aluminum of said compound or mixture of compounds ($b_3$) and the titanium of the bis-imine titanium complex having general formula (I) is ranging from 0.1 to 15, preferably from 1 to 6.

Examples of compounds or mixtures of compounds ($b_3$) able to produce an ionic catalytic system by reaction with a bis-imine titanium complex having general formula (I) according to the present invention are described, although with reference to the formation of ionic metallocene complexes, in the following publications, whose contents are incorporated herein for reference purposes:

Beck W. et al, "Chemical Reviews" (1988), Vol. 88, pg. 1405-1421;

Strauss S. H., "Chemical Reviews" (1993), Vol. 93, pg. 927-942;

European patent applications EP 277 003, EP 495 375, EP 520 732, EP 427 697, EP 421 659, EP 418 044;

international patent applications WO 92/00333, WO 92/05208.

Specific examples of compounds or mixtures of compounds ($b_3$) particularly useful for the purpose of the present invention are: tributylammonium-tetrakis-pentafluorophenyl-borate tributylammonium-tetrakis-pentafluorophenyl-aluminate, tributylammonium-tetrakis-[(3,5-di-(trifluoro-phenyl)]-borate, tributylammonium-tetrakis-(4-fluorophenyl)]-borate, N,N-dimethylbenzylammonium-tetrakis-pentafluoro-phenyl-borate, N,N-dimethyl-hexylammonium-tetrakis-pentafluorophenyl-borate, N,N-dimethylanilinium-tetrakis-(pentafluorophenyl)-borate, N,N-dimethylanilinium-tetrakis-(pentafluorophenyl)-aluminate, di-(propyl)-ammonium-tetrakis-(pentafluorophenyl)-borate, di-(cyclohexyl)-ammonium-tetrakis-(pentafluorophenyl)-borate, tri-phenyl-carbenium-tetrakis-(pentafluorophenyl)-borate, tri-phenylcarbenium-tetrakis-(penta-fluorophenyl)-aluminate, tris(pentafluorophenyl) borane, tris(pentafluorophenyl)-aluminum, or mixtures thereof. Tetrakis-pentafluorophenyl-borates are preferred.

For the purpose of the present description and of the following claims, the terms "mole" and "molar ratio" are used both with reference to compounds consisting of molecules and with reference to atoms and ions, omitting for the latter ones the terms gram atom or atomic ratio, even if they are scientifically more accurate.

For the purpose of the present invention, other additives or components may potentially be added to the aforementioned catalytic system so as to adapt it to satisfy specific practical requirements. The catalytic systems thus obtained can therefore be considered included within the scope of the present invention. Additives and/or components that can be added in the preparation and/or formulation of the catalytic system according to the present invention are, for example: inert solvents, such as, for example aliphatic and/or aromatic hydrocarbons; aliphatic and/or aromatic ethers; weakly coordinating additives (e.g., Lewis bases) selected, for example, from non-polymerizable olefins; sterically hindered or electronically poor ethers; halogenating agents such as, for example, silicon halides, halogenated hydrocarbons, preferably chlorinated; or mixtures thereof.

Said catalytic system can be prepared, as already reported above, according to methods known in the prior art.

For example, said catalytic system can be prepared separately (preformed) and subsequently introduced into the (co)polymerization environment. On this point, said catalytic system can be prepared by reacting at least one bis-imine titanium complex (a) having general formula (I) with at least one co-catalyst (b), optionally in the presence of other additives or components selected from those cited above, in the presence of a solvent such as, for example, toluene, heptane, at a temperature ranging from 20° C. to 60° C., for a time ranging from 10 seconds to 10 hours, preferably ranging from 30 seconds to 5 hours. Further details on the preparation of said catalytic system can be found in the examples reported below.

Alternatively, said catalytic system can be prepared in situ, i.e. directly in the (co)polymerization environment. On that point, said catalytic system can be prepared by separately introducing the bis-imine titanium complex (a) having general formula (I), the co-catalyst (b) and the pre-selected conjugated diene(s) to be (co)polymerized, operating at the conditions wherein the (co)polymerization is carried out.

For the purpose of the present invention, the aforementioned catalytic systems can also be supported on inert solids, preferably comprising silicon and/or aluminum oxides, such as, for example, silica, alumina or silico-aluminates. For supporting said catalytic systems the known supporting techniques can be used, generally comprising contact, in a suitable inert liquid medium, between the support, optionally activated by heating to temperatures over 200° C., and one or both components (a) and (b) of the catalytic system according to the present invention. It is not necessary, for the purposes of the present invention, for both components to be supported, since only the bis-imine titanium complex (a) having general formula (I), or the co-catalyst (b) may be present on the support surface. In the latter case, the missing component on the surface is subsequently placed in contact with the supported component when the active catalyst is to be formed by polymerization.

The scope of the present invention also includes the bis-imine titanium complex having general formula (I), and the catalytic systems based thereon, which are supported on a solid through the functionalization of the latter and the formation of a covalent bond between the solid and the bis-imine titanium complex having general formula (I). Furthermore, the present invention relates to a (co)polymerization process of conjugated dienes, characterized in that it uses said catalytic system.

The quantity of bis-imine titanium complex (a) having general formula (I) and of co-catalyst (b) which can be used in the (co)polymerization of conjugated dienes varies according to the (co)polymerization process to be carried out. Said quantity is however such as to obtain a molar ratio between the titanium present in the bis-imine titanium complex having general formula (I) and the metal present in the co-catalyst (b), e.g., aluminum in the case wherein the co-catalyst (b) is selected from the aluminum alkyls ($b_1$) or from the aluminoxanes ($b_2$), boron in the case wherein the co-catalyst (b) is selected from the compounds or mixtures of compounds ($b_3$), comprised between the values reported above.

Specific examples of conjugated dienes that can be (co) polymerized using the catalytic system in accordance with the present invention are: 1,3-butadiene, 2-methyl-1,3-butadiene (isoprene), 2,3-dimethyl-1,3-butadiene, 1,3-pentadiene, 1,3-hexadiene, cyclo-1,3-hexadiene. 1,3-butadiene is preferred. The aforementioned (co)polymerizable conjugated dienes can be used alone, or in mixture of two or more dienes. In this latter case, i.e. using a mixture of two or more dienes, a copolymer will be obtained.

In accordance with a particularly preferred embodiment, the present invention relates to a polymerization process of 1,3-butadiene, characterized in that it uses said catalytic system.

Generally, said (co)polymerization can be carried out in the presence of a polymerization solvent, generally selected from inert organic solvents such as, for example: saturated aliphatic hydrocarbons such as, for example, butane, pentane, hexane, heptane, or mixtures thereof; saturated cyclo-aliphatic hydrocarbons such as, for example, cyclopentane, cyclohexane, or mixtures thereof; mono-olefins such as, for example, 1-butene, 2-butene, or mixtures thereof; aromatic hydrocarbons such as, for example, benzene, toluene, xylene, or mixtures thereof; halogenated hydrocarbons such as, for example, dicholoromethane, chloroform, carbon tetrachloride, trichloroethylene, perchloroethylene, 1,2-dichloroethane, chlorobenzene, bromobenzene, chlorotoluene, or mixtures thereof. Preferably the (co)polymerization solvent is selected from saturated aliphatic hydrocarbons.

Alternatively, said (co)polymerization may be carried out using as a (co)polymerization solvent the same conjugated diene(s) that must be (co)polymerized, in accordance with the process known as "bulk process".

Generally, the concentration of the conjugated diene to be (co)polymerized in said (co)polymerization solvent is ranging from 5% by weight to 50% by weight, preferably ranging from 10% by weight to 20% by weight, with respect to the total weight of the conjugated diene mixture and inert organic solvent.

Generally, said (co)polymerization can be carried out at a temperature ranging from −70° C. to +100° C., preferably ranging from −20° C. to +80° C.

With regard to pressure, it is preferable to operate at the pressure of the components of the mixture to be (co) polymerized.

Said (co)polymerization can be carried out both continuously and in batches.

As mentioned above, said process allows (co)polymers of conjugated dienes to be obtained such as, for example, polybutadiene with a prevalent 1,4-cis unit content (i.e. 1,4-cis unit content ≥60%) which can be advantageously used for producing tires, in particular for tire treads.

For the purpose of understanding the present invention better and to put it into practice, below are some illustrative and non-limiting examples thereof.

EXAMPLES

Reagents and Materials

The list below reports the reagents and materials used in the following examples of the invention, any pre-treatments thereof and their manufacturer:

titanium tetrachloride ($TiCl_4$) (Aldrich): pure, 99.9%, distilled and stored in an inert atmosphere;

o-toluidine (Aldrich): distilled at reduced pressure and stored in an inert atmosphere;

p-toluidine (Aldrich): distilled at reduced pressure and stored in an inert atmosphere;

2-tert-butylaniline (Aldrich): distilled at reduced pressure and stored in an inert atmosphere;

2,6-dimethylaniline (Aldrich): distilled at reduced pressure and stored in an inert atmosphere;

2,6-di-iso-propylaniline (Aldrich): distilled at reduced pressure and stored in an inert atmosphere;

2,4,6-trimethylaniline (Aldrich): distilled at reduced pressure and stored in an inert atmosphere;

aniline (Aldrich): distilled at reduced pressure and stored in an inert atmosphere;

2,3-butanedione (Aldrich): used as such;

formic acid (85% by weight aqueous solution) (Carlo Erba, RPE): used as such;

methanol (Carlo Erba, RPE): used as such;

glyoxal (40% by weight aqueous solution) (Aldrich): used as such;

toluene (Fluka): pure, 99.5%, refluxed over sodium (Na) in an inert atmosphere for about 8 hours and subsequently distilled and maintained in said atmosphere, at 4° C., on molecular sieves;

heptane (Aldrich): pure, 99%, refluxed over sodium (Na) in an inert atmosphere for about 8 hours and subsequently distilled and maintained in said atmosphere, at 4° C., on molecular sieves;

tetrahydrofuran (THF) (Aldrich): refluxed over sodium (Na) in an inert atmosphere for about 8 hours and subsequently distilled and maintained in said atmosphere, at 4° C., on molecular sieves;

titanium tetrachloride:tetrahydrofuran complex (1:2) [$TiCl_4(THF)_2$]: prepared from titanium tetrachloride ($TiCl_4$) and tetrahydrofuran (THF) (molar ratio 1:2), in dichloromethane, at ambient temperature, according to the methodology reported by Manzer L. E. et al, in "*Inorganic Syntheses*" (1982), t. 2, Vol. 21, pg. 135-140;

1,3-butadiene (Air Liquide): pure, 99.5%, evaporated from the container before each production, dried by passing it through a molecular sieve packed column and condensed inside the reactor that was pre-cooled to −20° C.;

methylaluminoxane (MAO) (toluene solution 10% in weight) (Aldrich): used as such;

hydrochloric acid (37% by weight aqueous solution) (Aldrich): used as such;

hydrofluoric acid (HF) (40% by weight aqueous solution) (Aldrich): used as such;

sulfuric acid ($H_2SO_4$) (96% by weight aqueous solution) (Aldrich): used as such, or diluted with distilled water (1/5);

nitric acid ($HNO_3$) (70% by weight aqueous solution) (Aldrich): used as such;

sodium carbonate ($Na_2CO_3$) (Aldrich): used as such;

silver nitrate ($AgNO_3$) (Aldrich): used as such;

deuterated tetrachloroethylene ($C_2D_2Cl_4$) (Acros): used as such;

hexamethyldisilazane (HMDS) (Acros): used as such;

deuterated chloroform ($CDCl_3$) (Aldrich): used as such;

tetramethylsilane (TMS) (Acros): used as such;

o-dichlorobenzene (Aldrich): used as such.

The analysis and characterization methodologies reported below were used.

Elementary Analysis a) Determination of Titanium (Ti)

For the determination of the quantity by weight of titanium (Ti) in the bis-imine titanium complexes object of the present invention, an exactly weighed aliquot, operating in dry-box under nitrogen flow, of about 30 mg-50 mg of sample, was placed in a 30 ml platinum crucible, together with a 1 ml mixture of hydrofluoric acid (HF) (40% by weight aqueous solution), 0.25 ml of sulfuric acid ($H_2SO_4$) (96% by weight aqueous solution) and 1 ml of nitric acid ($HNO_3$) (70% by weight aqueous solution). The crucible was then heated on a hot plate increasing the temperature until white sulfur fumes appeared (about 200° C.). The mixture thus obtained was cooled to ambient temperature and 1 ml of nitric acid ($HNO_3$) (70% by weight aqueous solution) was added, then it was left again until fumes appeared. After repeating the sequence another two times, a clear, almost colorless, solution was obtained. 1 ml of nitric acid ($HNO_3$) (70% by weight aqueous solution) and about 15 ml of water were then added cold, then heated to 80° C., for about 30 minutes. The sample thus prepared was diluted with MilliQ pure water until it weighed about 50 g, precisely weighed, to obtain a solution on which the instrumental analytical determination was carried out using a Thermo Optek IRIS Advantage Duo ICP-OES (plasma optical emission) spectrometer, for comparison with solutions of known concentration. For this purpose, for every analyte, a calibration curve was prepared in the range 0 ppm-10 ppm, measuring calibration solutions by dilution by weight of certified solutions.

The solution of sample prepared as above was then diluted again by weight in order to obtain concentrations close to the reference ones, before carrying out spectrophotometric measurement. All the samples were prepared in double quantities. The results were considered acceptable if the individual repeated test data did not have a relative deviation of more than 2% relative to their mean value.

b) Determination of Chlorine (Cl)

For said purpose, samples of bis-imine titanium complexes object of the present invention, about 30 mg-50 mg, were precisely weighed in 100 ml glass beakers in dry-box under nitrogen flow. 2 g of sodium carbonate ($Na_2CO_3$) were added and, outside the dry-box, 50 ml of MilliQ water. It was brought to the boil on the hot plate, under magnetic stirring, for about 30 minutes. It was left to cool, then sulfuric acid ($H_2SO_4$) (96% by weight aqueous solution), diluted 1/5 with distilled water, was added, until acid reaction and was then titrated with 0.1 N silver nitrate ($AgNO_3$) with a potentiometric titrator.

c) Determination of Carbon (C), Hydrogen (H) and Nitrogen (N)

The determination of carbon (C), hydrogen (H) and nitrogen (N), in the bis-imine titanium complexes object of the present invention, like the ligands used for the purpose of the present invention, was carried out through a Carlo Erba automatic analyzer Mod. 1106.

$^{13}$C-HMR and $^1$H-HMR Spectra

The $^{13}$C-HMR and $^1$H-HMR spectra were recorded using a nuclear magnetic resonance spectrometer mod. Bruker Avance 400, using deuterated tetrachloroethylene ($C_2D_2Cl_4$) at 103° C., and hexamethyldisilazane (HMDS) as internal standard, or using deuterated chloroform ($CDCl_3$), at 25° C., and tetramethylsilane (TMS) as internal standard. For this purpose, polymeric solutions were used with concentrations equal to 10% by weight with respect to the total weight of the polymeric solution.

The microstructure of the polymers [i.e. 1,4-cis (%) and 1,2 unit content], was determined through the analysis of the aforementioned spectra based on what reported in the literature by Mochel, V. D., in "*Journal of Polymer Science Part A-1: Polymer Chemistry*" (1972), Vol. 10, Issue 4, pg. 1009-1018.

FT-IR Spectra (Solid State—UATR)

The FT-IR spectra (solid state—UATR) were recorded using a Bruker IFS 48 spectrophotometer equipped with a Thermo Spectra-Tech horizontal ATR connection. The section wherein the samples to be analyzed are placed is a Fresnel ATR accessory (Shelton, Conn., USA) which uses crystals of zirconium selenide (ZnSe) with an angle of incidence of 45° in the horizontal direction.

The FT-IR spectra (solid state—UATR) of the bis-imine titanium complexes object of the present invention, were obtained by inserting samples of the bis-imine titanium complex to be analyzed into said section.

I.R. Spectra

The I.R. (FT-IR) spectra were recorded through Thermo Nicolet Nexus 670 and Bruker IFS 48 spectrophotometers.

The I.R. (FT-IR) spectra of the ligands used in the present invention, were obtained by dispersing the ligand to be analyzed in anhydrous potassium bromide (KBr) (KBr disks), or in Nujol solution.

The I.R. (FT-IR) spectra of the polymers were obtained from polymeric films on potassium bromide (KBr) tablets, said films being obtained through the deposition of a solution in hot o-dichlorobenzene of the polymer to be analyzed. The concentration of the polymeric solutions analyzed was equal to 10% by weight with respect to the total weight of the polymeric solution.

Determination of the Molecular Weight

The determination of the molecular weight (MW) of the polymers obtained was carried out through GPC ("Gel Permeation Chromatography"), using the Waters® Alliance® GPCN 2000 System by Waters Corporation which uses two detection lines: "Refractive Index"—RI and "Viscometer" operating under the following conditions:

two PLgel Mixed-B columns;
solvent/eluent: o-dichlorobenzene;
flow rate: 0.8 ml/min;
temperature: 145° C.;
molecular mass calculation: Universal Calibration method.
The weight-average molecular weight ($M_w$) and the Polydispersion Index (PDI) are reported, corresponding to the ratio $M_w/M_n$ ($M_n$=number-average molecular weight).

Example 1

Synthesis of Ligand Having Formula (L1)

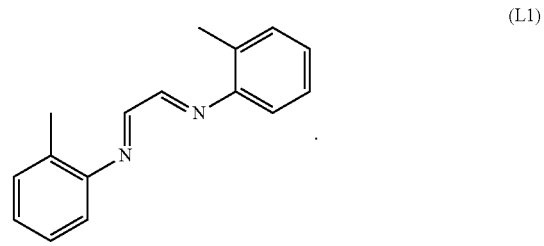 [SMILES: Cc1ccccc1/N=C/C=N/c1ccccc1C]

(L1)

A solution of 10.72 g (100 mmol) of o-toluidine in methanol (50 ml) was added, drop by drop, to a solution of 7.26 g (50 mmol) of glyoxal (40% by weight aqueous solution), cooled to 0° C. and kept under stirring and, subsequently some drops of formic acid (85% by weight aqueous solution): the reaction mixture obtained was left, under stirring, in a water/ice bath, until the formation of a precipitate was noted. Subsequently, everything was left to return to ambient temperature and the precipitate was filtered, washed with methanol and vacuum dried, at ambient temperature, obtaining 9.92 g of a yellow powder (yield=84%) corresponding to the ligand having formula (L1).

FT-IR (nujol): 1605 cm$^{-1}$ $\nu_{(C=N)}$.

Molecular weight (MW): 236.32.

Elementary analysis [found (calculated) for C$_{16}$H$_{16}$N$_2$]: C: 81.28% (81.32%); H: 6.80% (6.82%); N: 11.83% (11.85%).

Figure 1:
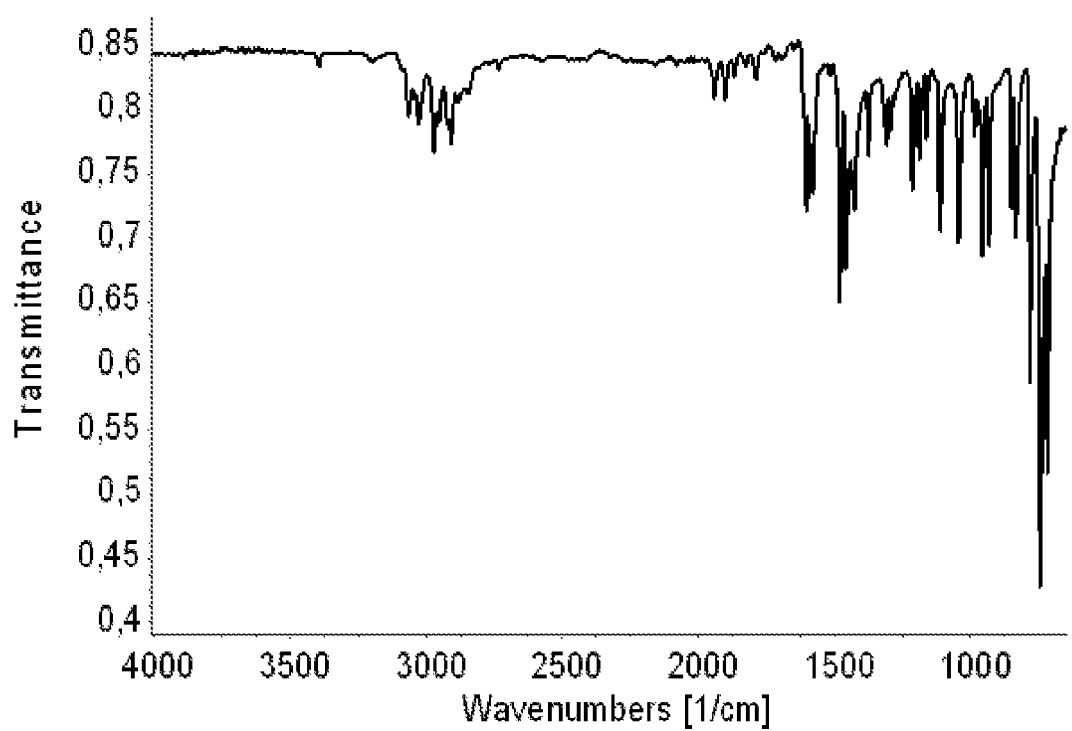
FIG. 1: FT-IR spectrum of the ligand (L1) described in Example 1.

FIG. 1 shows the FT-IR (solid state—UATR) spectrum of the ligand (L1) obtained.

Example 2

Synthesis of Ligand Having Formula (L2)

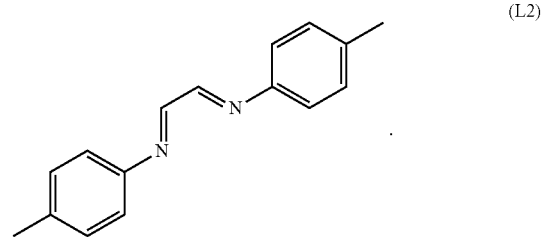

(L2)

A solution of 10.72 g (100 mmol) of p-toluidine in methanol (50 ml) was added, drop by drop, to a solution of 7.26 g (50 mmol) of glyoxal (40% by weight aqueous solution), cooled to 0° C. and kept under stirring and, subsequently some drops of formic acid (85% by weight aqueous solution): the reaction mixture obtained was left, under stirring, in a water/ice bath, until the formation of a precipitate was noted. Subsequently, everything was left to return to ambient temperature and the precipitate was filtered, washed with methanol and vacuum dried, at ambient temperature, obtaining 9 g of a yellow powder (yield=76%) corresponding to the ligand having formula (L2).

FT-IR (nujol): 1608 cm$^{-1}$ $v_{(C=N)}$.
Molecular weight (MW): 236.32.
Elementary analysis [found (calculated) for $C_{16}H_{16}N_2$]: C: 81.29% (81.32%); H: 6.82% (6.82%); N: 11.87% (11.85%).
$^1$H-NMR (CDCl$_3$, 5 ppm): 8.42 (s, 2H, CH), 7.23 (s, 8H, Ar—H), 2.39 (s, 6H, Ar—CH$_3$).

Figure 2:
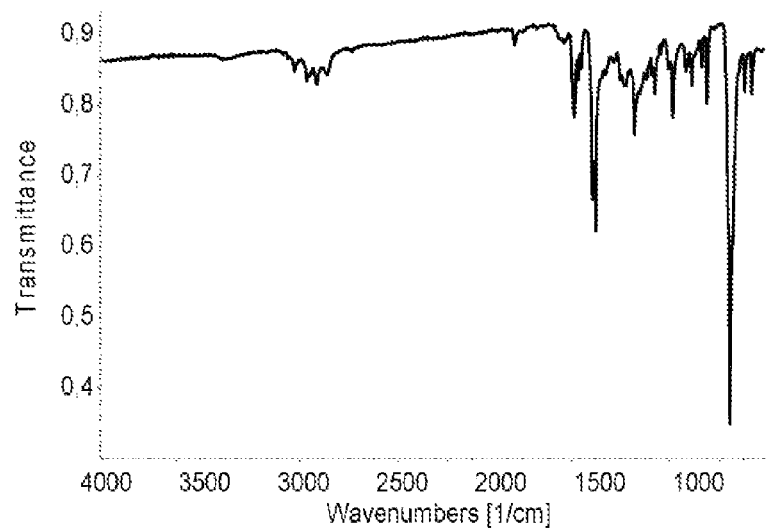
FIG. 2: FT-IR spectrum of the ligand (L2) described in Example 2.

FIG. 2 shows the FT-IR (solid state—UATR) spectrum of the ligand (L2) obtained.

Figure 3:
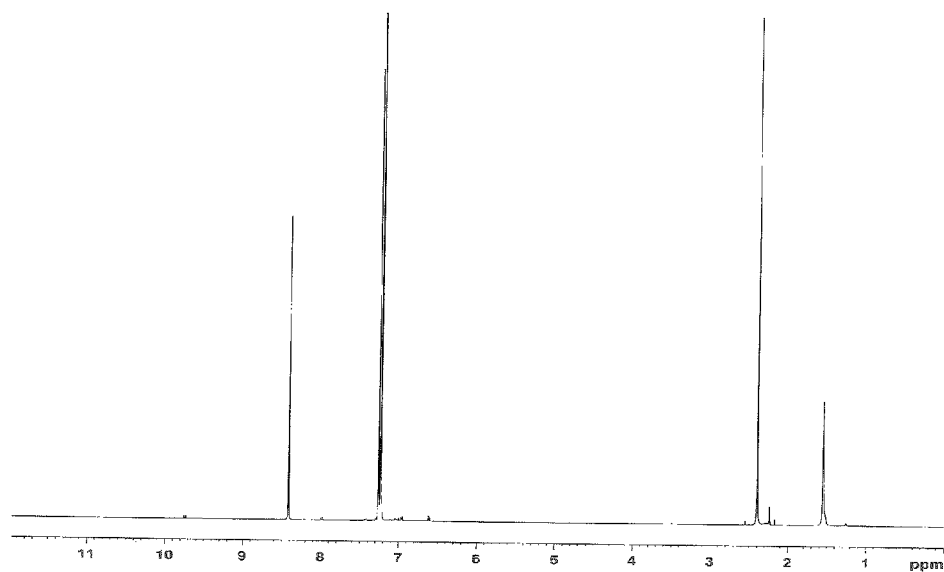
FIG. 3: $^1$H-NMR spectrum of the ligand (L2) described in Example 2.

FIG. 3 shows the $^1$H-NMR spectrum of the ligand (L2) obtained.

Example 3

Synthesis of Ligand Having Formula (L3)

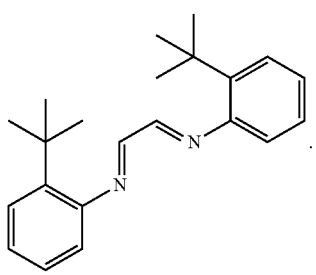

(L3)

A solution of 14.92 g (100 mmol) of 2-tert-butylaniline in methanol (100 ml) was added, drop by drop, to a solution of 7.26 g (50 mmol) of glyoxal (40% by weight aqueous solution), cooled to 0° C. and kept under stirring and, subsequently some drops of formic acid (85% by weight aqueous solution): the reaction mixture obtained was left, under stirring, in a water/ice bath, until the formation of a precipitate was noted. Subsequently, everything was left to return to ambient temperature and the precipitate was filtered, washed with methanol and vacuum dried, at ambient temperature, obtaining 12 g of a yellow powder (yield=75%) corresponding to the ligand having formula (L3).

FT-IR (nujol): 1608 cm$^{-1}$ $v_{(C=N)}$.
Molecular weight (MW): 320.48.
Elementary analysis [found (calculated) for $C_{22}H_{28}N_2$]: C: 82.42% (82.45%); H: 8.80% (8.81%); N: 8.76% (8.74%).

Figure 4:
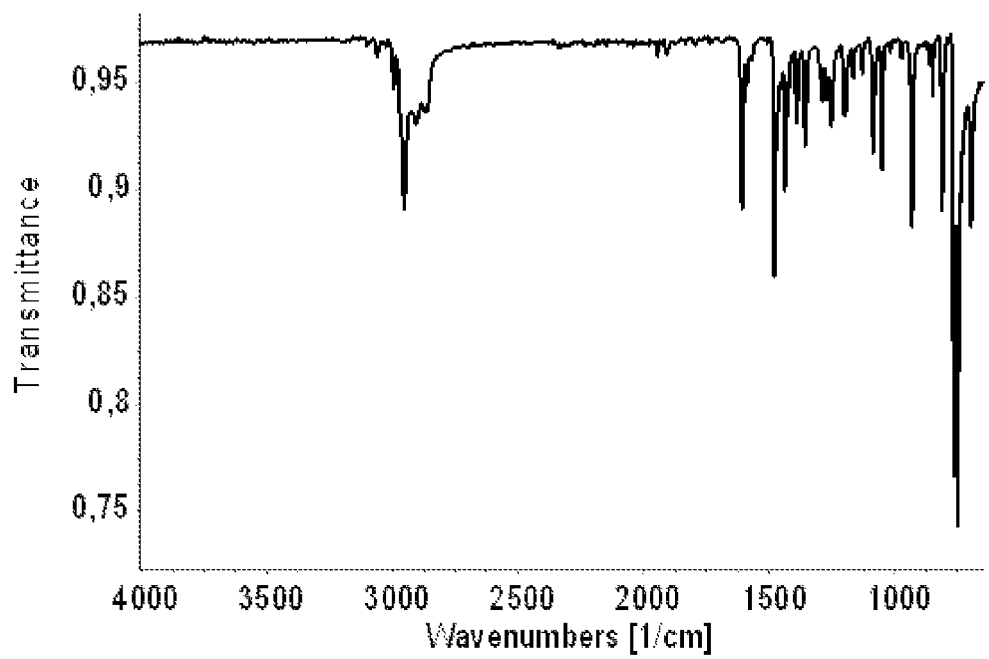
FIG. 4: FT-IR spectrum of the ligand (L3) described in Example 3.

FIG. 4 shows the FT-IR (solid state—UATR) spectrum of the ligand (L3) obtained.

Example 4

Synthesis of Ligand Having Formula (L4)

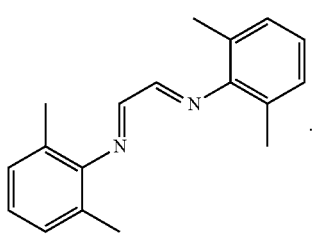

(L4)

A solution of 12.12 g (100 mmol) of 2,6-dimethylaniline in methanol (100) was added, drop by drop, to a solution of 7.26 g (50 mmol) of glyoxal (40% by weight aqueous solution), cooled to ambient temperature and kept under stirring and, subsequently some drops of formic acid (85% by weight aqueous solution): the reaction mixture obtained was left, under stirring, in a water/ice bath, until the formation of a precipitate was noted. Subsequently, everything was left to return to ambient temperature and the precipitate was filtered, washed with methanol and vacuum dried, at ambient temperature, obtaining 12 g of a yellow powder (yield=90%) corresponding to the ligand having formula (L4).

FT-IR (nujol): 1610 cm$^{-1}$ $v_{(C=N)}$.
Molecular weight (MW): 264.37.
Elementary analysis [found (calculated) for $C_{18}H_{20}N_2$]: C: 81.72% (81.78%); H: 7.61% (7.63%); N: 10.63% (10.60%).

Figure 5:
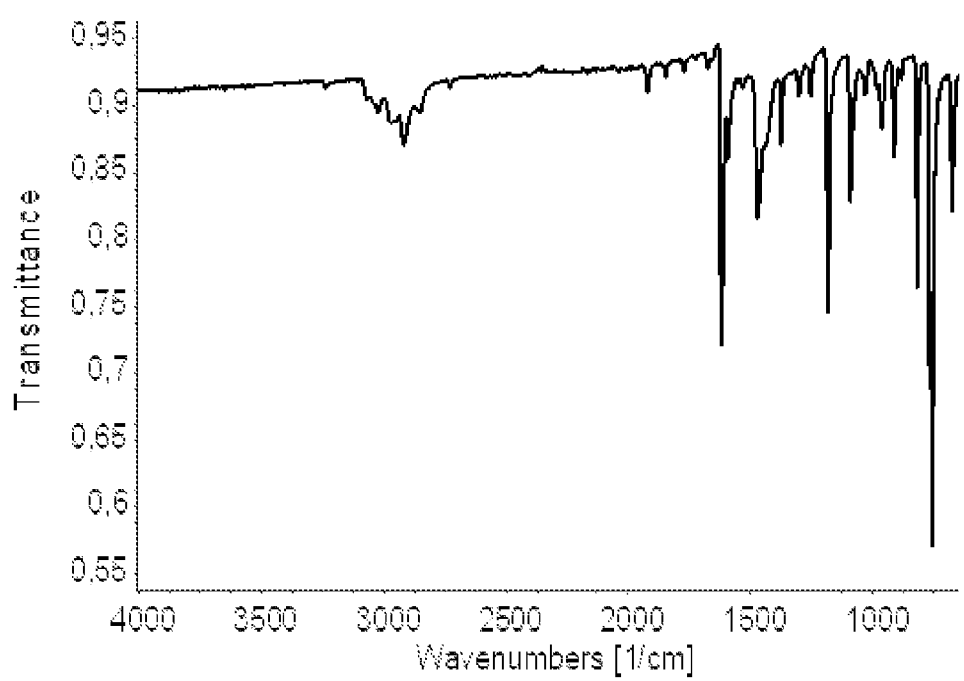
FIG. 5: FT-IR spectrum of the ligand (L4) described in Example 4.

FIG. 5 shows the FT-IR (solid state—UATR) spectrum of the ligand (L4) obtained.

Example 5

Synthesis of Ligand Having Formula (L5)

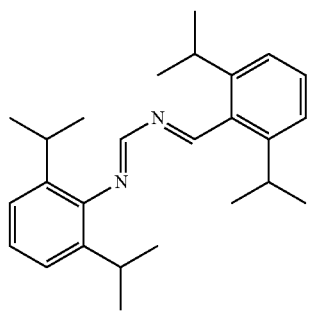

(L5)

A solution of 17.73 g (100 mmol) of 2,6-di-iso-propylaniline in methanol (50 ml) was added, drop by drop, to a solution of 7.26 g (50 mmol) of glyoxal (40% by weight aqueous solution) in methanol and distilled water (30 ml+10 ml, respectively), cooled to 0° C. and kept under stirring, and, subsequently some drops of formic acid (85% by weight aqueous solution): the reaction mixture obtained was left, under stirring, at ambient temperature, until the formation of a precipitate was noted, which was filtered, washed with methanol, and vacuum dried, at ambient temperature, obtaining 14 g of a yellow powder (yield=74%) corresponding to the ligand having formula (L5).

FT-IR (nujol): 1614 cm$^{-1}$ $v_{(C=N)}$.
Molecular weight (MW): 376.59.
Elementary analysis [found (calculated) for $C_{26}H_{36}N_2$]: C: 82.88% (82.93%); H: 9.85% (9.64%); N: 7.99% (7.44%).
$^1$H-NMR (CDCl$_3$, ppm): 1.22 (d, 24H, CH(CH$_3$)$_2$); 2.95 (m, 4H, CH(CH$_3$)$_2$); 7.19-7.22 (m, 6H C$_6$H$_3$); 8.11 (s, 2H, NCH).

Figure 6:
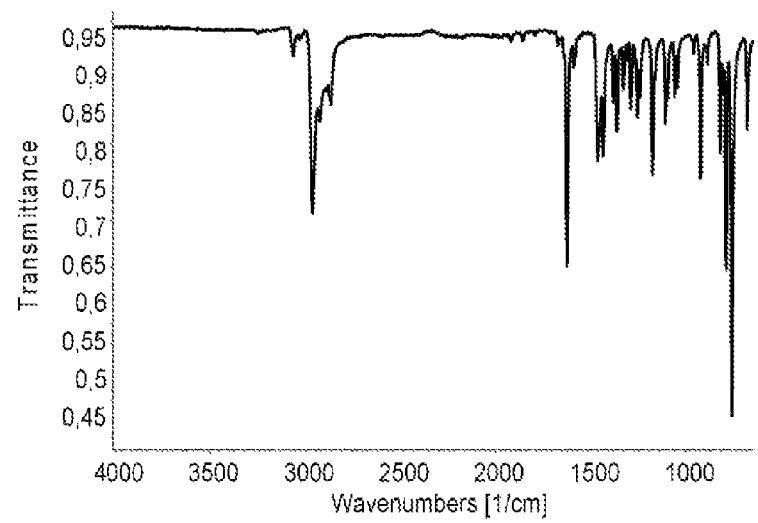
FIG. 6: FT-IR spectrum of the ligand (L5) described in Example 5.

FIG. 6 shows the FT-IR (solid state—UATR) spectrum of the ligand (L5) obtained.

Figure 7:
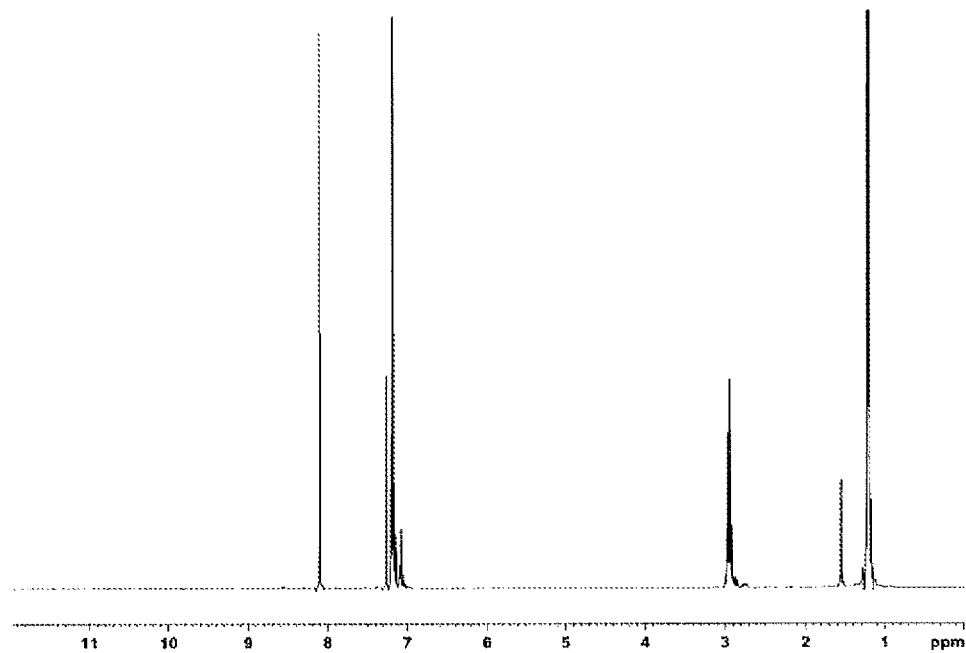
FIG. 7: $^1$H-NMR spectrum of the ligand (L5) described in Example 5.

FIG. 7 shows the $^1$H-NMR spectrum of the ligand (L5) obtained.

Example 6

Synthesis of Ligand Having Formula (L6)

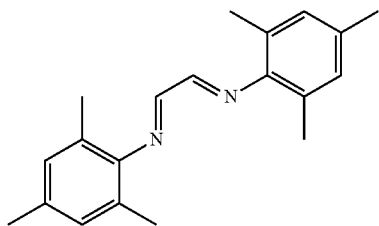

A solution of 13.52 g (100 mmol) of 2,4,6-trimethylaniline in methanol (50 ml) was added, drop by drop, to a solution of 7.26 g (50 mmol) of glyoxal (40% by weight aqueous solution) in methanol (50 ml), cooled to ambient temperature and kept under stirring and, subsequently some drops of formic acid (85% by weight aqueous solution): the reaction mixture obtained was left, under stirring, in a water/ice bath, until the formation of a precipitate was noted. Subsequently, everything was left to return to ambient temperature and the precipitate was filtered, washed with methanol and vacuum dried, at ambient temperature, obtaining 12 g of a yellow powder (yield=82%) corresponding to the ligand having formula (L6).

FT-IR (nujol): 1616 cm$^{-1}$ $v_{(C=N)}$.

Molecular weight (MW): 292.442.

Elementary analysis [found (calculated) for $C_{20}H_{24}N_2$]: C: 82.0% (82.15%); H: 8.28% (8.27%); N: 9.51% (9.58%).

$^1$H-NMR (CDCl$_3$, ppm): 2.15 (s, 12H, 2,6-(CH$_3$)$_2$—C$_6$H$_2$), 2.29 (s, 6H, 4-CH$_3$—C$_6$H$_2$), 6.90 (s, 4H, C$_6$H$_2$), 8.09 (s, 2H, NCH).

Figure 8:
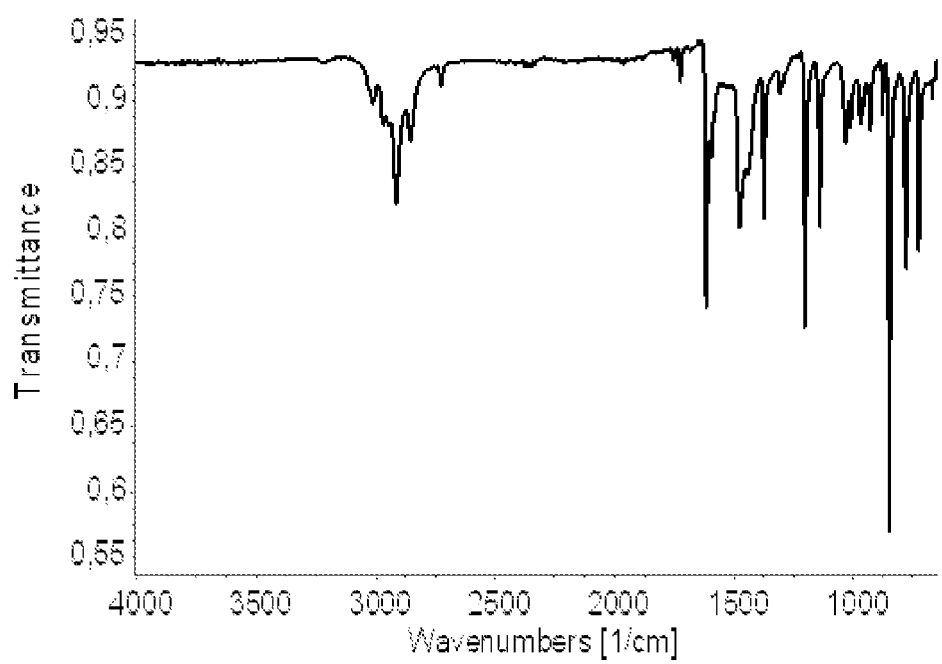
FIG. 8: FT-IR spectrum of the ligand (L6) described in Example 6.

FIG. 8 shows the FT-IR (solid state—UATR) spectrum of the ligand (L6) obtained.

Example 7

Synthesis of Ligand Having Formula (L7)

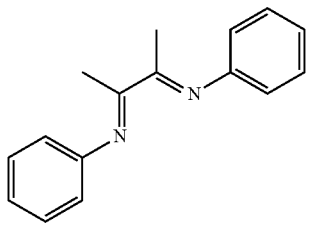
(L7)

Sequentially and under stirring, a solution of 9.3 g (100 mmol) of aniline in methanol (80 ml), a solution of 4.3 g (50 mmol) of 2,3-butandione in methanol (50 ml) and some drops of formic acid (85% by weight aqueous solution) were loaded into a 500 ml reactor. Everything was left, under stirring, at ambient temperature, for about 2 hours, until the formation of a precipitate was noted, which was left to rest for 14 hours, at ambient temperature. Subsequently, the precipitate obtained was filtered, washed with methanol and vacuum dried, at ambient temperature, obtaining 12 g of a yellow powder (yield=98%) corresponding to the ligand having formula (L7).

FT-IR (nujol): 1634 cm$^{-1}$ $v_{(C=N)}$.

Molecular weight (MW): 292.42.

Elementary analysis [found (calculated) for $C_{16}H_{16}N_2$]: C: 81.42% (81.32%); H: 6.33% (6.82%); N: 11.92% (11.85%).

$^1$H NMR (CDCl$_3$ δ ppm) 7.06 (m, 2H); 7.29 (m, 4H); 6.85 (m, 4H); 2.19 (s, 6H).

Figure 9:
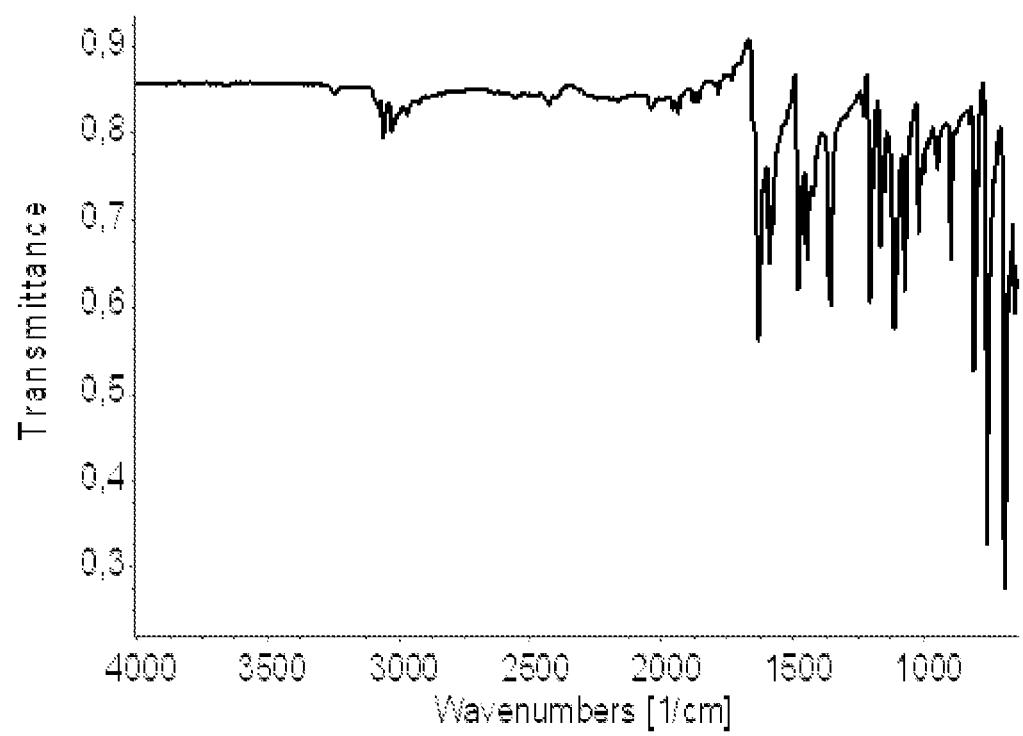
FIG. 9: FT-IR spectrum of the ligand (L7) described in Example 7.

FIG. 9 shows the FT-IR (solid state—UATR) spectrum of the ligand (L7) obtained.

Example 8

Synthesis of Ligand Having Formula (L8)

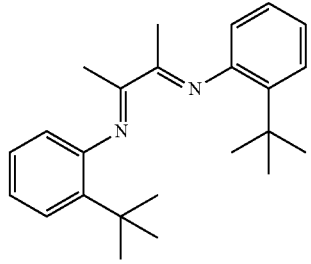
(L8)

Sequentially and under stirring, a solution of 13.43 g (90 mmol) of tert-butylaniline in methanol (50 ml), and some drops of formic acid (85% by weight aqueous solution) were loaded into a 500 ml reactor obtaining a solution. A solution of 3.87 g (45 mmol) of 2,3-butanedione in methanol (30 ml) was added to said solution drop by drop, under stirring. Everything was left, under stirring, at ambient temperature, for about 2 hours, until the formation of a precipitate was noted, which was left to rest for 14 hours, at ambient temperature. Subsequently, the precipitate was filtered, washed with methanol and vacuum dried, at ambient temperature, obtaining 14.1 g of a yellow powder (yield=90%) corresponding to the ligand having formula (L8).

FT-IR (nujol): 1636 cm$^{-1}$ $v_{(C=N)}$.

Molecular weight (MW): 348.52.

Elementary analysis [found (calculated) for $C_{24}H_{32}N_2$]: C: 81.95% (82.71%); H: 9.26% (9.25%); N: 8.02% (8.01%).

NMR (CDCl$_3$ δ ppm) 7.42 (dd, 2H); 7.19 (m, 2H); 7.08 (m, 2H); 6.51 (dd, 2H); 2.21 (s, 6H); 1.36 (s 18H).

Figure 10:
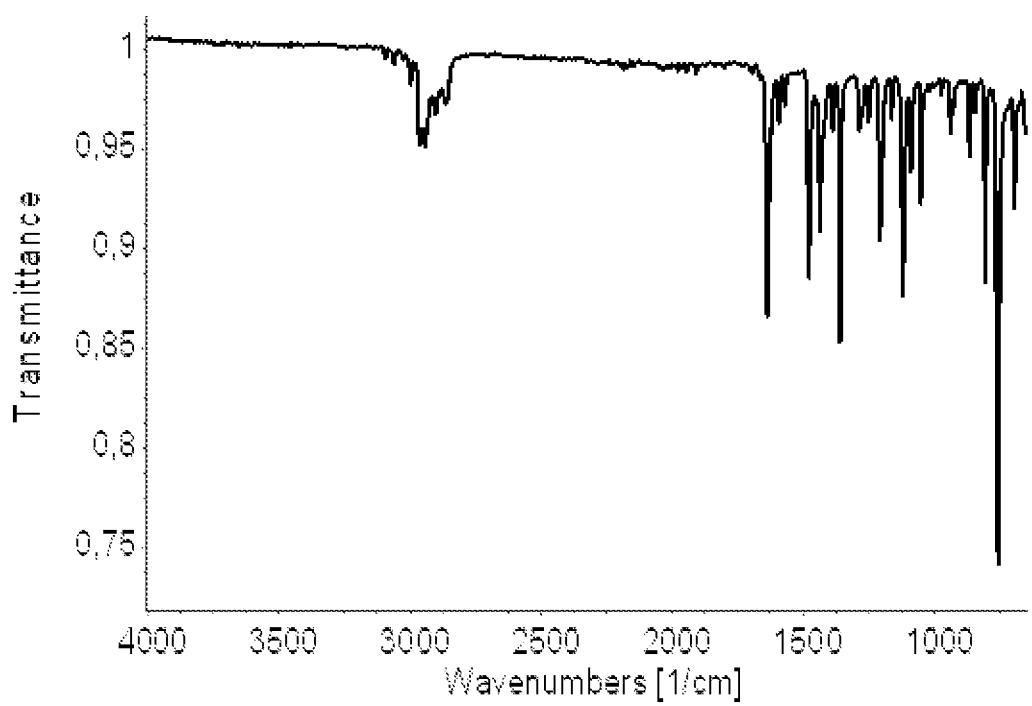
FIG. 10: FT-IR spectrum of the ligand (L8) described in Example 8.

FIG. 10 shows the FT-IR (solid state—UATR) spectrum of the ligand (L8) obtained.

Example 9

Synthesis of TiCl$_4$(L1) [Sample MG270]

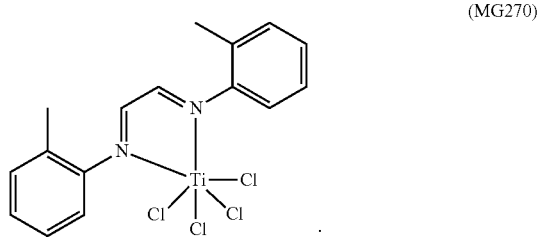
(MG270)

In a 100 ml Schlenk tube, titanium tetrachloride (TiCl$_4$) (121 mg; 0.63 mmoles; molar ratio L1/Ti=1) was added to a solution of the ligand having formula (L1) (150 mg; 0.63 mmoles), obtained as described in Example 1, in toluene (20 ml): the mixture obtained was left, under stirring, at ambient temperature, for 18 hours. The suspension obtained was vacuum dried, at ambient temperature, and the solid obtained was washed with heptane (2×10 ml) and vacuum dried, at ambient temperature, obtaining 224 mg of an orange solid product corresponding to the complex TiCl$_4$(L1), equal to an 83% conversion with respect to the titanium tetrachloride (TiCl$_4$) loaded.

Elementary analysis [found (calculated) for C$_{16}$H$_{16}$Cl$_4$N$_2$Ti]: C: 45.61% (45.11%); H: 3.56% (3.79%); N: 6.08% (6.58%); Cl: 33.00% (33.29%); Ti: 10.95% (11.24%).

Figure 11:
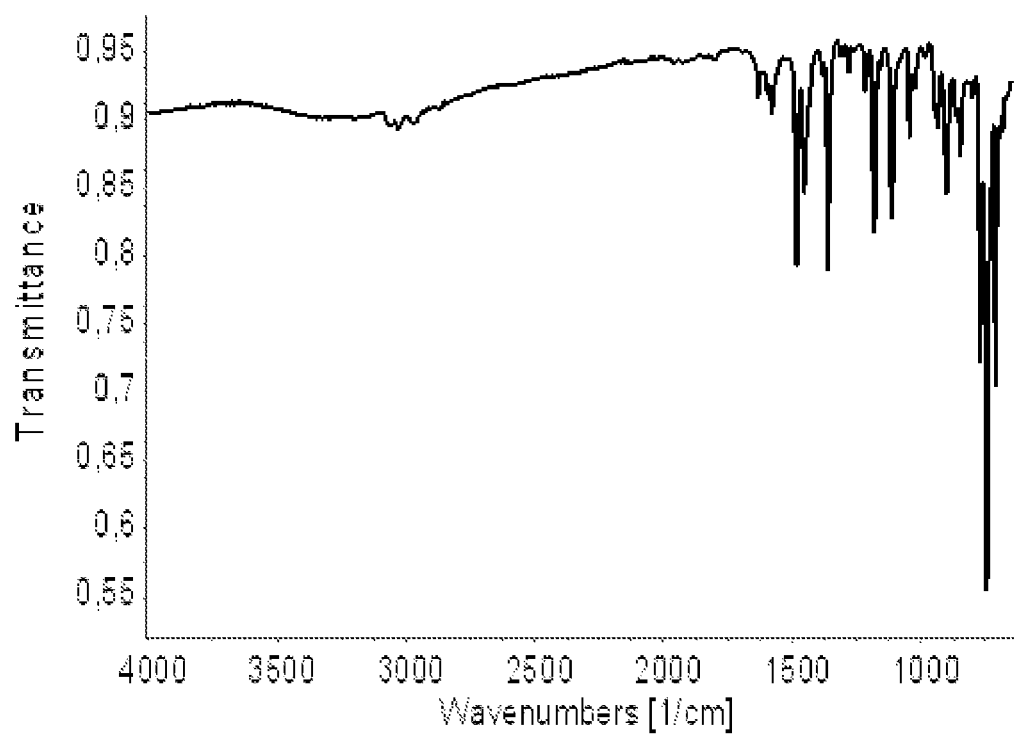
FIG. 11: FT-IR spectrum of the complex TiCl$_4$(L1) [named sample MG270] described in Example 9.

FIG. 11 shows the FT-IR spectrum of the complex TiCl$_4$(L1) obtained.

Example 10

Synthesis of TiCl$_4$(L2) [Sample MG291]

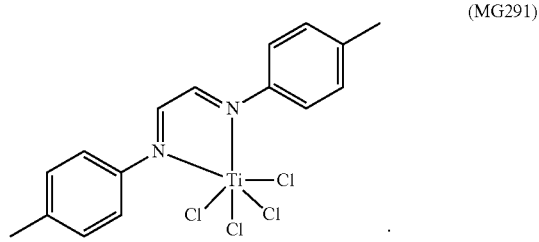
(MG291)

In a 100 ml Schlenk tube, the titanium tetrachloride:tetrahydrofuran complex (1:2) [TiCl$_4$(THF)$_2$] (231 mg; 0.69 mmoles; molar ratio L2/Ti=1) was added to a solution of the ligand having formula (L2) (163 mg; 0.69 mmoles), obtained as described in Example 2, in toluene (20 ml): the mixture obtained was left, under stirring, at ambient temperature, for 18 hours. The suspension obtained was vacuum dried, at ambient temperature, and the solid obtained was washed with heptane (2×10 ml) and vacuum dried, at ambient temperature, obtaining 268 mg of a brown solid product corresponding to the complex TiCl$_4$(L2), equal to a 91% conversion with respect to the titanium tetrachloride:tetrahydrofuran complex (1:2) [TiCl$_4$(THF)$_2$].

Elementary analysis [found (calculated) for C$_{16}$H$_{16}$Cl$_4$N$_2$Ti]: C: 45.73% (45.11%); H: 4.05% (3.79%); N: 6.32% (6.58%); Cl: 32.95% (33.29%); Ti: 10.87% (11.24%).

Figure 12:
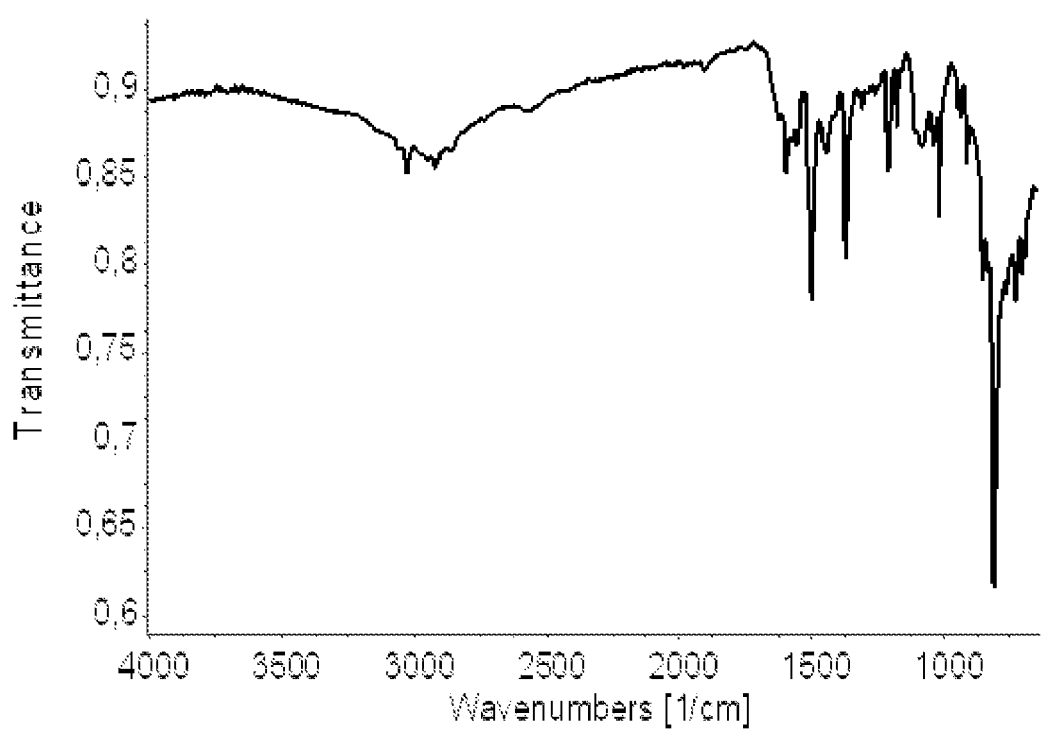
FIG. 12: FT-IR spectrum of the complex TiCl$_4$(L2) [named sample MG291] described in Example 10.

FIG. 12 shows the FT-IR spectrum of the complex TiCl$_4$(L2) obtained.

Example 11

Synthesis of TiCl$_4$(L3) [Sample MG274]

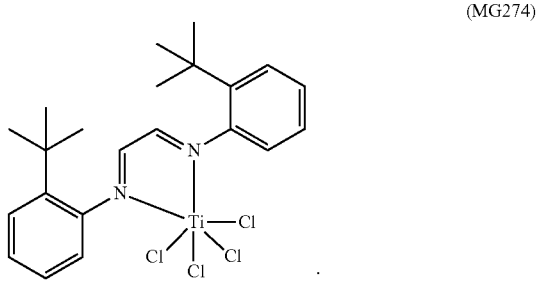
(MG274)

In a 100 ml Schlenk tube, titanium tetrachloride (TiCl$_4$) (119 mg; 0.63 mmoles; molar ratio L3/Ti=1) was added to a solution of the ligand having formula (L3) (200 mg; 0.62 mmoles), obtained as described in Example 3, in toluene (20 ml): the mixture obtained was left, under stirring, at ambient temperature, for 18 hours. The suspension obtained was vacuum dried, at ambient temperature, and the solid obtained was washed with heptane (2×10 ml) and vacuum dried, at ambient temperature, obtaining 236 mg of an ochre solid product corresponding to the complex TiCl$_4$(L3), equal to a 75% conversion with respect to the titanium tetrachloride (TiCl$_4$) loaded.

Elementary analysis [found (calculated) for C$_{22}$H$_{28}$Cl$_4$N$_2$Ti]: C: 51.46% (51.80%); H: 5.23% (5.53%); N: 5.75% (5.49%); Cl: 27.20% (27.80%); Ti: 8.98% (9.38%).

Figure 13:
FIG. 13: FT-IR spectrum of the complex TiCl$_4$(L3) [named sample MG274] described in Example 11.

FIG. 13 shows the FT-IR spectrum of the complex TiCl$_4$(L3) obtained.

Example 12

Synthesis of TiCl$_4$(L3) [Sample MG290]

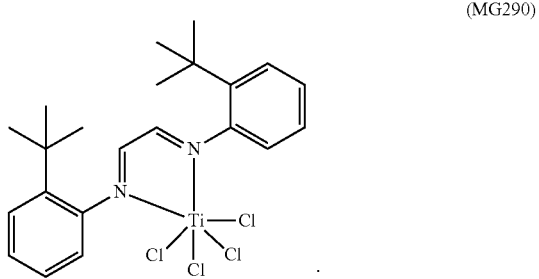
(MG290)

In a 100 ml Schlenk tube, the titanium tetrachloride:tetrahydrofuran complex (1:2) [TiCl$_4$(THF)$_2$] (246 mg; 0.74 mmoles; molar ratio L3/Ti=1) was added to a solution of the ligand having formula (L3) (236 mg; 0.74 mmoles), obtained as described in Example 3, in toluene (20 ml): the mixture obtained was left, under stirring, at ambient temperature, for 18 hours. The suspension obtained was vacuum dried, at ambient temperature, and the solid obtained was washed with heptane (2×10 ml) and vacuum dried, at ambient temperature, obtaining 236 mg of a brown solid product corresponding to the complex TiCl$_4$(L3), equal to a 61% conversion with respect to the titanium tetrachloride:tetrahydrofuran complex (1:2) [TiCl4(THF)$_2$].

Elementary analysis [found (calculated) for C$_{22}$H$_{28}$Cl$_4$N$_2$Ti]: C: 51.00% (51.80%); H: 4.92% (5.53%); N: 5.29% (5.49%); Cl: 26.98% (27.80%); Ti: 9.01% (9.38%).

Figure 14:
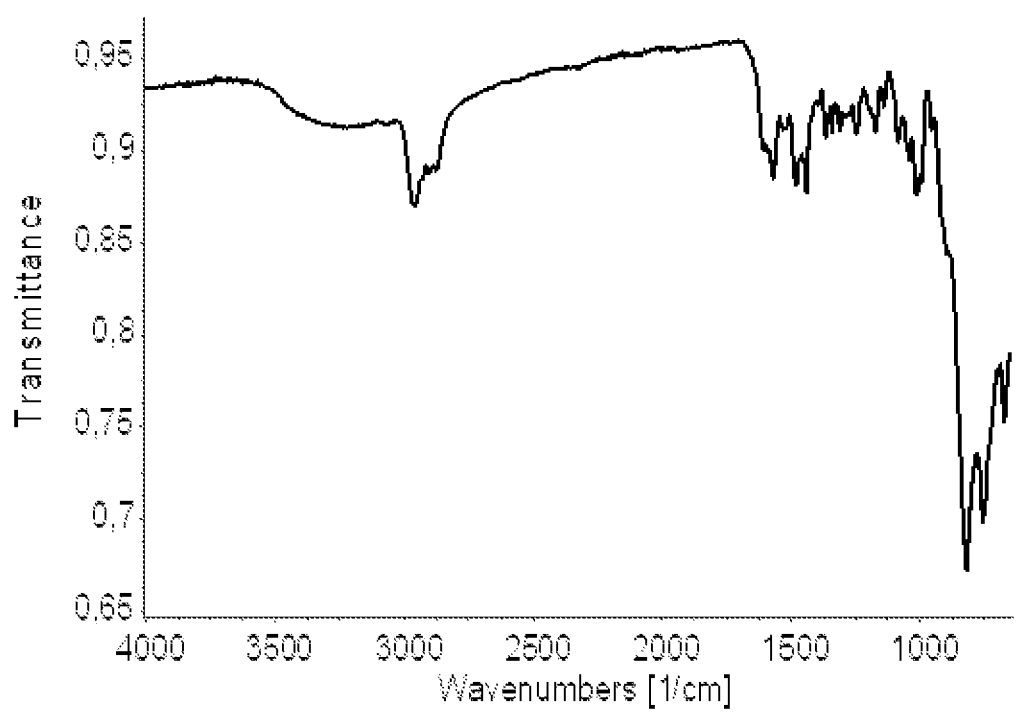
FIG. 14: FT-IR spectrum of the complex TiCl$_4$(L3) [named sample MG290] described in Example 12.

FIG. 14 shows the FT-IR spectrum of the complex TiCl$_4$(L3) obtained.

Example 13

Synthesis of TiCl$_4$(L4) [Sample MG271]

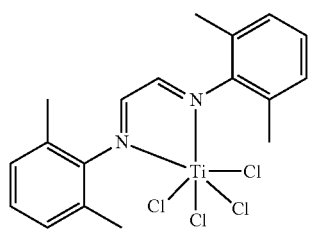
(MG271)

In a 100 ml Schlenk tube, (TiCl$_4$) (144 mg; 0.76 mmoles; molar ratio L4/Ti=1) was added to a solution of the ligand having formula (L4) (200 mg; 0.76 mmoles), obtained as described in Example 4, in toluene (20 ml): the mixture obtained was left, under stirring, at ambient temperature, for 18 hours. The suspension obtained was vacuum dried, at ambient temperature, and the solid obtained was washed with heptane (2×10 ml) and vacuum dried, at ambient temperature, obtaining 236 mg of an ochre solid product corresponding to the complex TiCl$_4$(L4), equal to an 85% conversion with respect to the titanium tetrachloride (TiCl$_4$) loaded.

Elementary analysis [found (calculated) for C$_{18}$H$_{20}$C$_{14}$N$_2$Ti]: C: 48.11% (47.61%); H: 4.58% (4.44%); N: 5.95% (6.17%); Cl: 31.00% (31.23%); Ti: 9.95% (10.54%).

Figure 15:
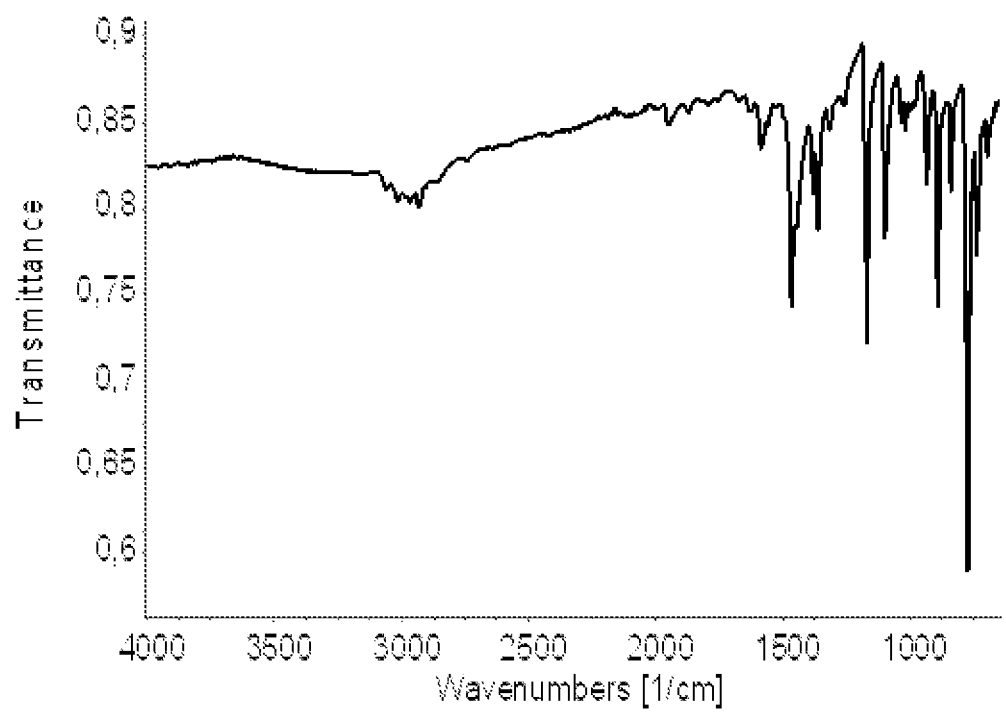
FIG. 15: FT-IR spectrum of the complex TiCl$_4$(L4) [named sample MG271] described in Example 13.

FIG. 15 shows the FT-IR spectrum of the complex TiCl$_4$(L4) obtained.

Example 14

Synthesis of TiCl$_4$(L5) [Sample MG284]

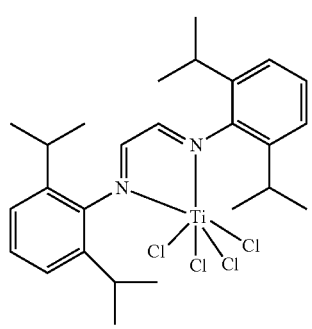
(MG284)

In a 100 ml Schlenk tube, the titanium tetrachloride:tetrahydrofuran complex (1:2) [TiCl$_4$(THF)$_2$] (184 mg; 0.55 mmoles; molar ratio L5/Ti=1) was added to a solution of the ligand having formula (L5) (207 mg; 0.55 mmoles), obtained as described in Example 5, in toluene (20 ml): the mixture obtained was left, under stirring, at ambient temperature, for 18 hours. The suspension obtained was vacuum dried, at ambient temperature, and the solid obtained was washed with heptane (2×10 ml) and vacuum dried, at ambient temperature, obtaining 215 mg of a red solid product corresponding to the complex TiCl$_4$(L5), equal to a 69% conversion with respect to the titanium tetrachloride:tetrahydrofuran complex (1:2) [TiCl$_4$(THF)$_2$].

Elementary analysis [found (calculated) for C$_{26}$H$_{36}$Cl$_4$N$_2$Ti]: C: 53.91% (55.15%); H: 6.70% (6.41%); N: 4.50% (4.95%); Cl: 28.30% (25.04%); Ti: 7.90% (8.45%).

Figure 16:
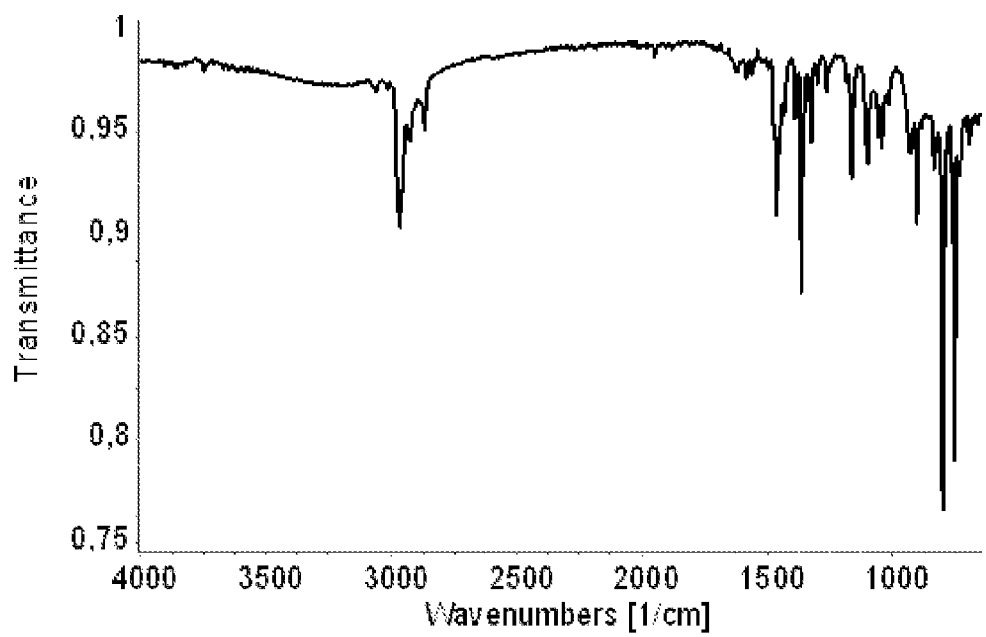
FIG. 16: FT-IR spectrum of the complex TiCl$_4$(L5) [named sample MG284] described in Example 14.

FIG. 16 shows the FT-IR spectrum of the complex TiCl$_4$(L5) obtained.

Example 15

Synthesis of TiCl$_4$(L6) [Sample MG288]

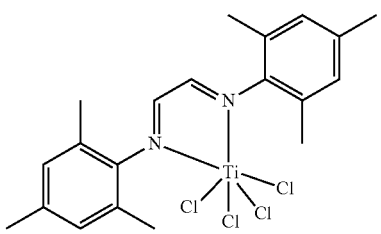
(MG288)

In a 100 ml Schlenk tube, the titanium tetrachloride:tetrahydrofuran complex (1:2) [TiCl$_4$(THF)$_2$] (238 mg; 0.71 mmoles; molar ratio L6/Ti=1) was added to a solution of the ligand having formula (L6) (208 mg; 0.71 mmoles), obtained as described in Example 6, in toluene (20 ml): the mixture obtained was left, under stirring, at ambient temperature, for 18 hours. The suspension obtained was vacuum dried, at ambient temperature, and the solid obtained was washed with heptane (2×10 ml) and vacuum dried, at ambient temperature, obtaining 263 mg of a red solid product corresponding to the complex TiCl$_4$(L6), equal to a 77% conversion with respect to the titanium tetrachloride:tetrahydrofuran complex (1:2) [TiCl$_4$(THF)$_2$].

Elementary analysis [found (calculated) for C$_{20}$H$_{24}$Cl$_4$N$_2$Ti]: C: 49.46% (49.83%); H: 4.98% (5.02%); N: 5.38% (5.81%); Cl: 28.40% (29.42%); Ti: 9.50% (9.93%).

Figure 17:
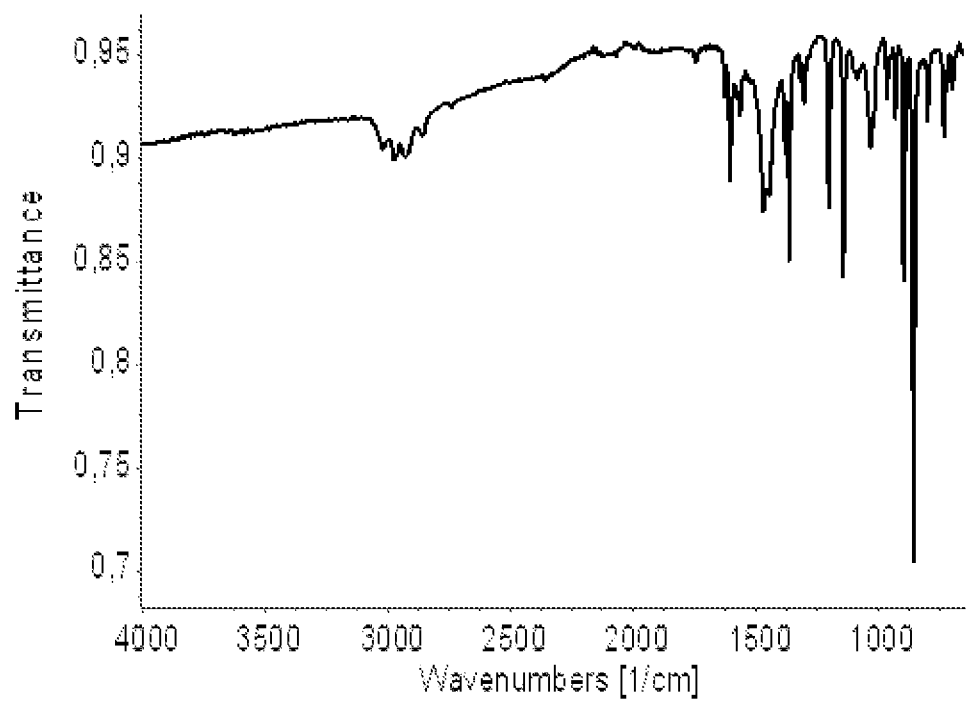
FIG. 17: FT-IR spectrum of the complex TiCl$_4$(L6) [named sample MG288] described in Example 15.

FIG. 17 shows the FT-IR spectrum of the complex TiCl$_4$(L6) obtained.

Example 16

Synthesis of TiCl$_4$(L7) [Sample MG402A]

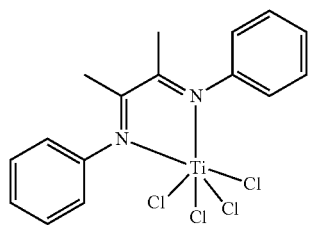

(MG402A)

In a 100 ml Schlenk tube, the titanium tetrachloride:tetrahydrofuran complex (1:2) [TiCl$_4$(THF)$_2$] (185 mg; 0.55 mmoles; molar ratio L7/Ti=1) was added to a solution of the ligand having formula (L7) (131 mg; 0.55 mmoles), obtained as described in Example 7, in toluene (20 ml): the mixture obtained was left, under stirring, at ambient temperature, for 18 hours. The suspension obtained was vacuum dried, at ambient temperature, and the solid obtained was washed with heptane (2×10 ml) and vacuum dried, at ambient temperature, obtaining 152 mg of an orange/brown solid product corresponding to the complex TiCl$_4$(L7), equal to a 65% conversion with respect to the titanium tetrachloride:tetrahydrofuran complex (1:2) [TiCl$_4$(THF)$_2$].

Elementary analysis [found (calculated) for C$_{16}$H$_{16}$C$_{14}$N$_2$Ti]: C: 44.45% (45.11%); H: 3.86% (3.79%); N: 6.41% (6.58%); Cl: 32.29% (33.29%); Ti: 11.00% (11.24%).

Figure 18:
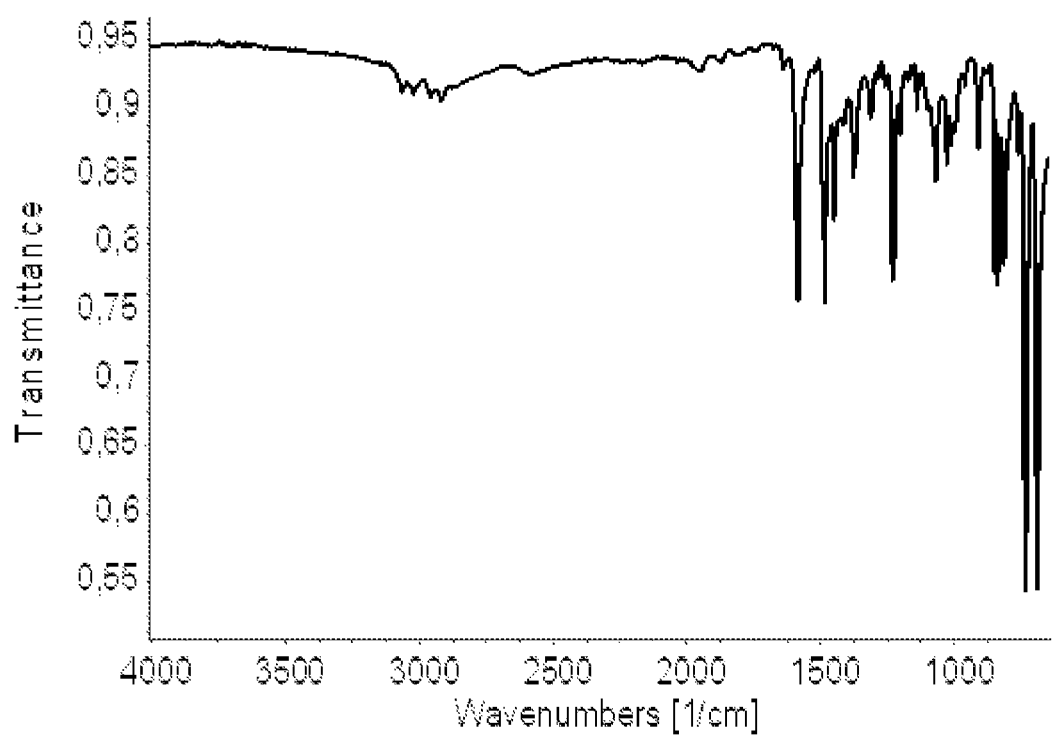
FIG. 18: FT-IR spectrum of the complex TiCl$_4$(L6) [named sample MG402A] described in Example 16.

FIG. 18 shows the FT-IR spectrum of the complex TiCl$_4$ (L6) obtained.

Example 17

Synthesis of TiCl$_4$(L8) [Sample MG404A]

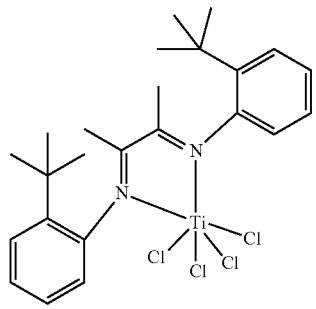

(MG404A)

In a 100 ml Schlenk tube, titanium tetrachloride (TiCl$_4$) (67 mg; 0.35 mmoles; molar ratio L8/Ti=1) was added to a solution of the ligand having formula (L8) (123 mg; 0.35 mmoles), obtained as described in Example 8, in toluene (10 ml): the mixture obtained was left, under stirring, at ambient temperature, for 18 hours. The suspension obtained was vacuum dried, at ambient temperature, and the solid obtained was washed with heptane (2×15 ml) and vacuum dried, at ambient temperature, obtaining 88 mg of an orange solid product corresponding to the complex TiCl$_4$(L8), equal to a 47% conversion with respect to the titanium tetrachloride (TiCl$_4$) loaded.

Elementary analysis [found (calculated) for C$_{24}$H$_{32}$Cl$_4$N$_2$Ti]: C: 52.99% (53.56%); H: 5.74% (5.99%); N: 5.06% (5.20%); Cl: 25.89% (26.35%); Ti: 8.59% (8.89%).

Figure 19:
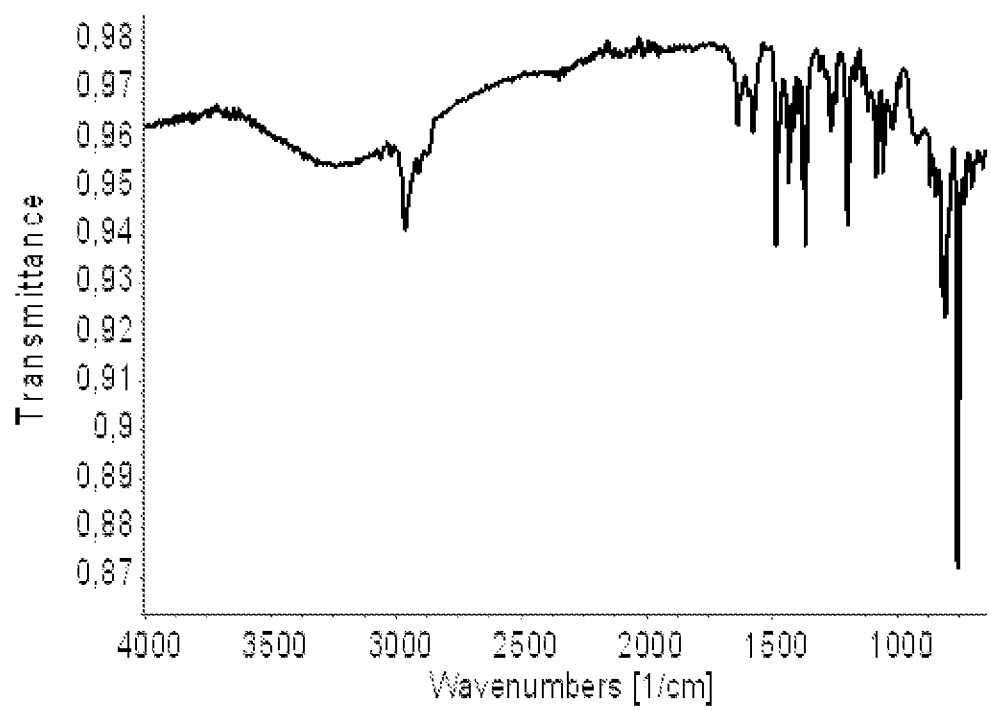
FIG. 19: FT-IR spectrum of the complex TiCl$_4$(L8) [named sample MG404A] described in Example 17.

FIG. 19 shows the FT-IR spectrum of the complex TiCl$_4$ (L8) obtained.

Example 18 (ZG305)

2 ml of 1,3-butadiene equal to about 1.4 g were condensed, cold (−20° C.) in a 25 ml test tube. Subsequently, 7.6 ml of toluene were added and the temperature of the solution thus obtained was brought to 20° C. Then, methylaluminoxane (MAO) in toluene solution (6.3 ml; 1×10$^{-2}$ moles, equal to about 0.58 g) was added and, subsequently, the TiCl$_4$(L1) complex [sample MG270] (2.1 ml of toluene suspension at a concentration of 2 mg/ml; 1×10$^{-5}$, equal to about 4.26 mg) obtained as described in Example 9. Everything was kept under magnetic stirring, at 25° C., for 60 minutes. The polymerization was then stopped by adding 2 ml of methanol containing some drops of hydrochloric acid (37% by weight aqueous solution). The polymer obtained was then coagulated by adding 40 ml of a methanol solution containing 4% of Irganox® 1076 antioxidant (Ciba) obtaining 0.74 g of polybutadiene having a 1,4-cis unit content of 85%: further characteristics of the procedure and of the polybutadiene obtained are reported in Table 1.

Figure 20:
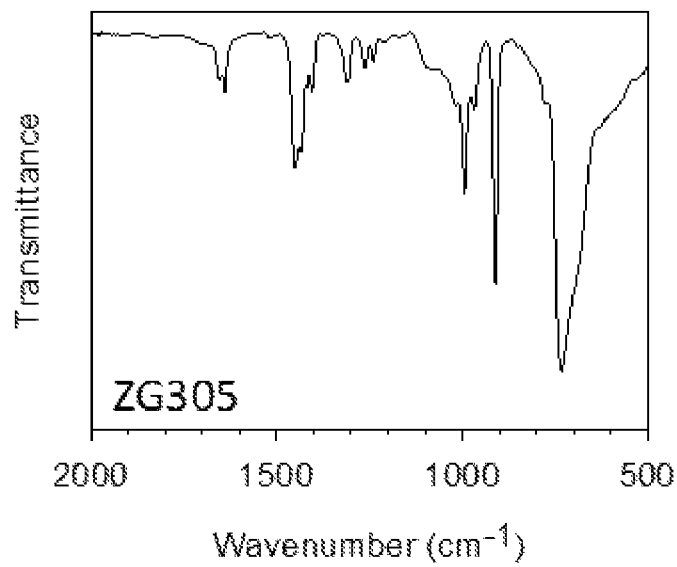
FIG. 20: FT-IR spectrum of the polybutadiene [named sample ZG305] described in Example 18.

FIG. 20 shows the FT-IR spectrum of the polybutadiene obtained.

Example 19 (ZG311)

2 ml of 1,3-butadiene equal to about 1.4 g were condensed, cold (−20° C.) in a 25 ml test tube. Subsequently, 7.6 ml of toluene were added and the temperature of the solution thus obtained was brought to 25° C. Then, methylaluminoxane (MAO) in toluene solution (6.3 ml; 1×10$^{-2}$ moles, equal to about 0.58 g) was added and, subsequently, the TiCl$_4$(L2) complex [sample MG291] (2.1 ml of toluene suspension at a concentration of 2 mg/ml; 1×10$^{-5}$, equal to about 4.26 mg) obtained as described in Example 10. Everything was kept under magnetic stirring, at 25° C., for 60 minutes. The polymerization was then stopped by adding 2 ml of methanol containing some drops of hydrochloric acid (37% by weight aqueous solution). The polymer obtained was then coagulated by adding 40 ml of a methanol solution containing 4% of Irganox® 1076 antioxidant (Ciba) obtaining 0.80 g of polybutadiene having a 1,4-cis unit content of 86%: further characteristics of the procedure and of the polybutadiene obtained are reported in Table 1.

Figure 21:
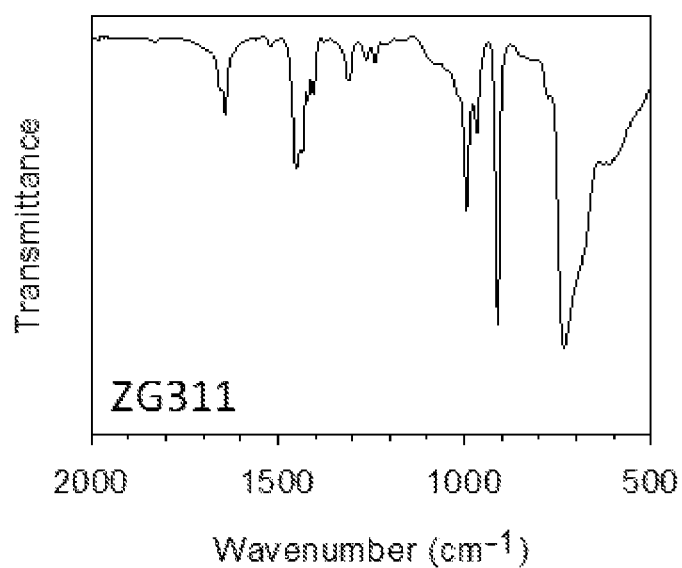
FIG. 21: FT-IR spectrum of the polybutadiene [named sample ZG311] described in Example 19.

FIG. 21 shows the FT-IR spectrum of the polybutadiene obtained.

Example 20 (ZG310)

2 ml of 1,3-butadiene equal to about 1.4 g were condensed, cold (−20° C.) in a 25 ml test tube. Subsequently, 7.15 ml of toluene were added and the temperature of the solution thus obtained was brought to 25° C. Then, methylaluminoxane (MAO) in toluene solution (6.3 ml; 1×10$^{-2}$ moles, equal to about 0.58 g) was added and, subsequently, the TiCl$_4$(L3) complex [sample MG290] (2.55 ml of toluene suspension at a concentration of 2 mg/ml; 1×10$^{-5}$, equal to about 5.1 mg) obtained as described in Example 12. Everything was kept under magnetic stirring, at 25° C., for 60 minutes. The polymerization was then stopped by adding 2 ml of methanol containing some drops of hydrochloric acid (37% by weight aqueous solution). The polymer obtained was then coagulated by adding 40 ml of a methanol solution containing 4% of Irganox® 1076 antioxidant (Ciba) obtaining 0.87 g of polybutadiene having a 1,4-cis unit content of 80%: further characteristics of the procedure and of the polybutadiene obtained are reported in Table 1.

Figure 22:
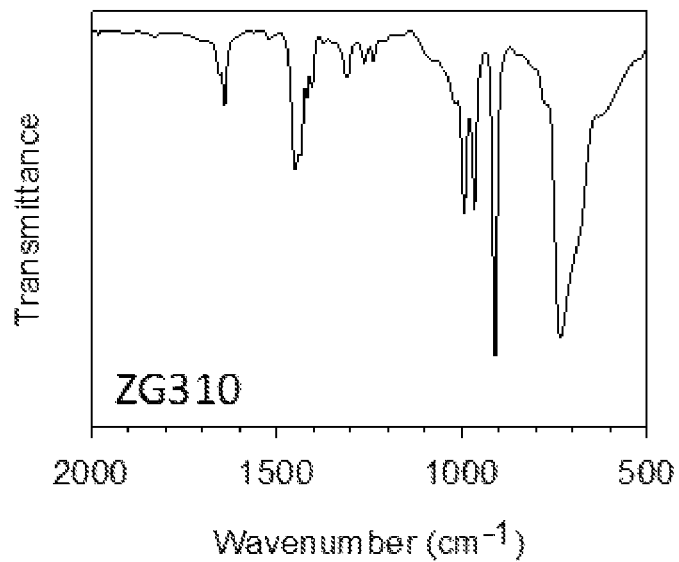
FIG. 22: FT-IR spectrum of the polybutadiene [named sample ZG310] described in Example 20.

FIG. 22 shows the FT-IR spectrum of the polybutadiene obtained.

Example 21 (ZG310/1)

2 ml of 1,3-butadiene equal to about 1.4 g were condensed, cold (−20° C.) in a 25 ml test tube. Subsequently, 7.15 ml of toluene were added and the temperature of the solution thus obtained was brought to 25° C. Then, methylaluminoxane (MAO) in toluene solution (6.3 ml; $1 \times 10^{-2}$ moles, equal to about 0.58 g) was added and, subsequently, the $TiCl_4(L3)$ complex [sample MG274] (2.55 ml of toluene suspension at a concentration of 2 mg/ml; $1 \times 10^{-5}$, equal to about 5.1 mg) obtained as described in Example 11. Everything was kept under magnetic stirring, at 25° C., for 60 minutes. The polymerization was then stopped by adding 2 ml of methanol containing some drops of hydrochloric acid (37% by weight aqueous solution). The polymer obtained was then coagulated by adding 40 ml of a methanol solution containing 4% of Irganox® 1076 antioxidant (Ciba) obtaining 0.82 g of polybutadiene having a 1,4-cis unit content of 81%; further characteristics of the procedure and of the polybutadiene obtained are reported in Table 1.

Example 22 (ZG309)

2 ml of 1,3-butadiene equal to about 1.4 g were condensed, cold (−20° C.) in a 25 ml test tube. Subsequently, 7.4 ml of toluene were added and the temperature of the solution thus obtained was brought to 25° C. Then, methylaluminoxane (MAO) in toluene solution (6.3 ml; $1 \times 10^{-2}$ moles, equal to about 0.58 g) was added and, subsequently, the $TiCl_4(L4)$ complex [sample MG271] (2.3 ml of toluene suspension at a concentration of 2 mg/ml; $1 \times 10^{-5}$, equal to about 4.54 mg) obtained as described in Example 13. Everything was kept under magnetic stirring, at 25° C., for 30 minutes. The polymerization was then stopped by adding 2 ml of methanol containing some drops of hydrochloric acid (37% by weight aqueous solution). The polymer obtained was then coagulated by adding 40 ml of a methanol solution containing 4% of Irganox® 1076 antioxidant (Ciba) obtaining 0.43 g of polybutadiene having a 1,4-cis unit content of 73%: further characteristics of the procedure and of the polybutadiene obtained are reported in Table 1.

Figure 23:
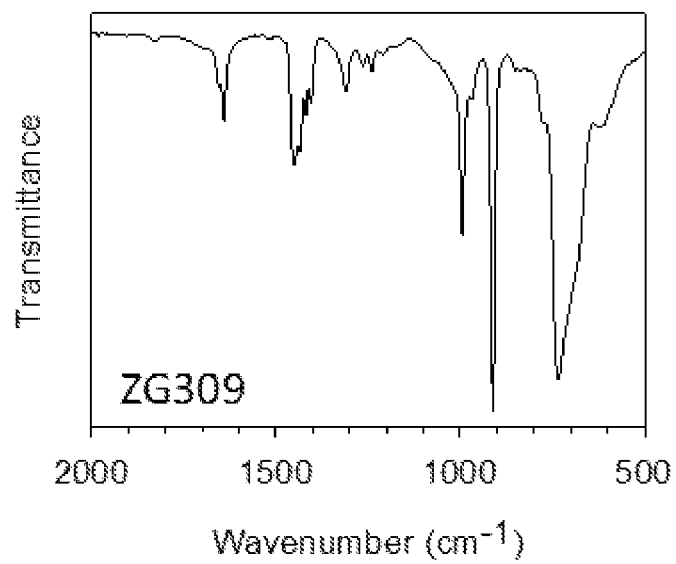
FIG. 23: FT-IR spectrum of the polybutadiene [named sample ZG309] described in Example 22.

FIG. 23 shows the FT-IR spectrum of the polybutadiene obtained.

Example 23 (ZG302)

2 ml of 1,3-butadiene equal to about 1.4 g were condensed, cold (−20° C.) in a 25 ml test tube. Subsequently, 6.9 ml of toluene were added and the temperature of the solution thus obtained was brought to 25° C. Then, methylaluminoxane (MAO) in toluene solution (6.3 ml; $1 \times 10^{-2}$ moles, equal to about 0.58 g) was added and, subsequently, the $TiCl_4(L5)$ complex [sample MG284] (2.81 ml of toluene suspension at a concentration of 2 mg/ml; $1 \times 10^{-5}$, equal to about 5.62 mg) obtained as described in Example 14. Everything was kept under magnetic stirring, at 25° C., for 30 minutes. The polymerization was then stopped by adding 2 ml of methanol containing some drops of hydrochloric acid (37% by weight aqueous solution). The polymer obtained was then coagulated by adding 40 ml of a methanol solution containing 4% of Irganox® 1076 antioxidant (Ciba) obtaining 1.29 g of polybutadiene having a 1,4-cis unit content of 60%: further characteristics of the procedure and of the polybutadiene obtained are reported in Table 1.

Example 24 (ZG307)

2 ml of 1,3-butadiene equal to about 1.4 g were condensed, cold (−20° C.) in a 25 ml test tube. Subsequently, 11.5 ml of toluene were added and the temperature of the solution thus obtained was brought to 25° C. Then, methylaluminoxane (MAO) in toluene solution (3.15 ml; $5 \times 10^{-3}$ moles, equal to about 0.27 g) was added and, subsequently, the $TiCl_4(L5)$ complex [sample MG284] (1.4 ml of toluene suspension at a concentration of 2 mg/ml; $1 \times 10^{-6}$, equal to about 2.81 mg) obtained as described in Example 14. Everything was kept under magnetic stirring, at 25° C., for 60 minutes. The polymerization was then stopped by adding 2 ml of methanol containing some drops of hydrochloric acid (37% by weight aqueous solution). The polymer obtained was then coagulated by adding 40 ml of a methanol solution containing 4% of Irganox® 1076 antioxidant (Ciba) obtaining 1.12 g of polybutadiene having a 1,4-cis unit content of 60%: further characteristics of the procedure and of the polybutadiene obtained are reported in Table 1.

Figure 24:
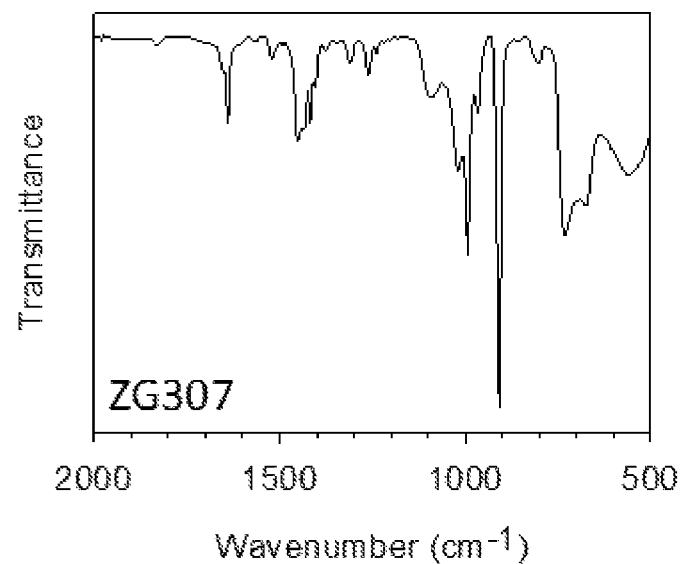
FIG. 24: FT-IR spectrum of the polybutadiene [named sample ZG307] described in Example 24.

FIG. 24 shows the FT-IR spectrum of the polybutadiene obtained.

Example 25 (ZG308)

2 ml of 1,3-butadiene equal to about 1.4 g were condensed, cold (−20° C.) in a 25 ml test tube. Subsequently, 9.1 ml of toluene were added and the temperature of the solution thus obtained was brought to 25° C. Then, methylaluminoxane (MAO) in toluene solution (1.26 ml; $2 \times 10^{-3}$ moles, equal to about 0.12 g) was added and, subsequently, the $TiCl_4(L5)$ complex [sample MG284] (5.64 ml of toluene suspension at a concentration of 2 mg/ml; $2 \times 10^{-5}$, equal to about 11.24 mg) obtained as described in Example 14.

Everything was kept under magnetic stirring, at 25° C., for 120 minutes. The polymerization was then stopped by adding 2 ml of methanol containing some drops of hydrochloric acid (37% by weight aqueous solution). The polymer obtained was then coagulated by adding 40 ml of a methanol solution containing 4% of Irganox® 1076 antioxidant (Ciba) obtaining 0.68 g of polybutadiene having a 1,4-cis unit content of 62%: further characteristics of the procedure and of the polybutadiene obtained are reported in Table 1.

Figure 25:
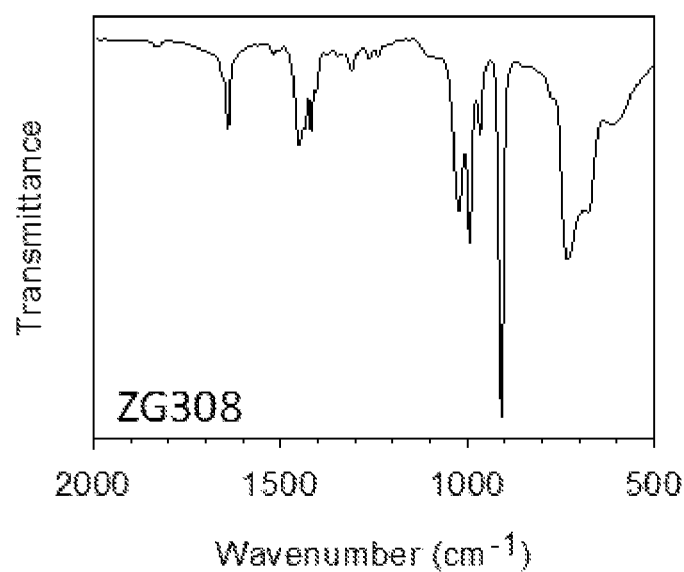
FIG. 25: FT-IR spectrum of the polybutadiene [named sample ZG308] described in Example 25.

FIG. 25 shows the FT-IR spectrum of the polybutadiene obtained.

Example 26 (ZG312)

2 ml of 1,3-butadiene equal to about 1.4 g were condensed, cold (−20° C.) in a 25 ml test tube. Subsequently, 7.3 ml of toluene were added and the temperature of the solution thus obtained was brought to 25° C. Then, methylaluminoxane (MAO) in toluene solution (6.3 ml; $1 \times 10^{-2}$ moles, equal to about 0.58 g) was added and, subsequently, the $TiCl_4(L6)$ complex [sample MG288] (2.4 ml of toluene suspension at a concentration of 2 mg/ml; $1 \times 10^{-5}$, equal to about 4.8 mg) obtained as described in Example 15. Everything was kept under magnetic stirring, at 25° C., for 25 minutes. The polymerization was then stopped by adding 2 ml of methanol containing some drops of hydrochloric acid (37% by weight aqueous solution). The polymer obtained was then coagulated by adding 40 ml of a methanol solution containing 4% of Irganox® 1076 antioxidant (Ciba) obtaining 0.43 g of polybutadiene having a 1,4-cis unit content of 76%: further characteristics of the procedure and of the polybutadiene obtained are reported in Table 1.

Figure 26:
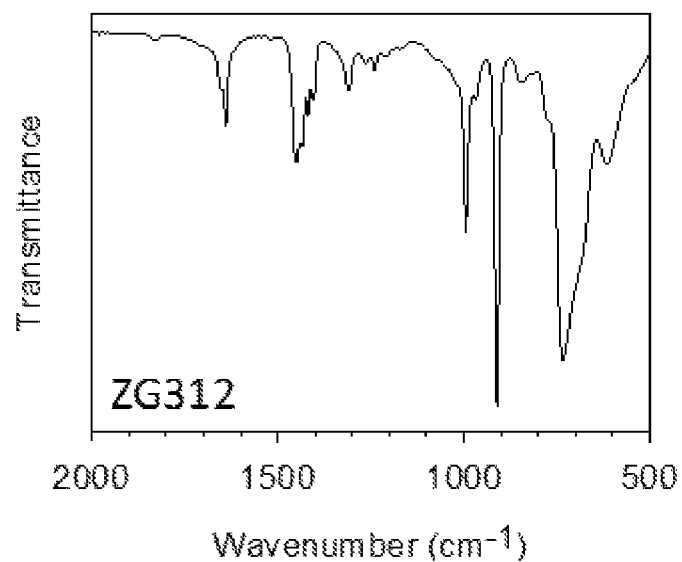
FIG. 26: FT-IR spectrum of the polybutadiene [named sample ZG312] described in Example 26.

FIG. 26 shows the FT-IR spectrum of the polybutadiene obtained.

Example 27 (G1603)

2 ml of 1,3-butadiene equal to about 1.4 g were condensed, cold (−20° C.) in a 25 ml test tube. Subsequently, 7.57 ml of toluene were added and the temperature of the solution thus obtained was brought to 25° C. Then, methylaluminoxane (MAO) in toluene solution (6.3 ml; $1 \times 10^{-2}$ moles, equal to about 0.58 g) was added and, subsequently, the $TiCl_4(L7)$ complex [sample MG402A] (2.13 ml of toluene suspension at a concentration of 2 mg/ml; $1 \times 10^{-5}$, equal to about 4.26 mg) obtained as described in Example 16. Everything was kept under magnetic stirring, at 25° C., for 20 minutes. The polymerization was then stopped by adding 2 ml of methanol containing some drops of hydrochloric acid (37% by weight aqueous solution). The polymer obtained was then coagulated by adding 40 ml of a methanol solution containing 4% of Irganox® 1076 antioxidant (Ciba) obtaining 0.799 g of polybutadiene having a 1,4-cis unit content of 82%: further characteristics of the procedure and of the polybutadiene obtained are reported in Table 1.

Figure 27:
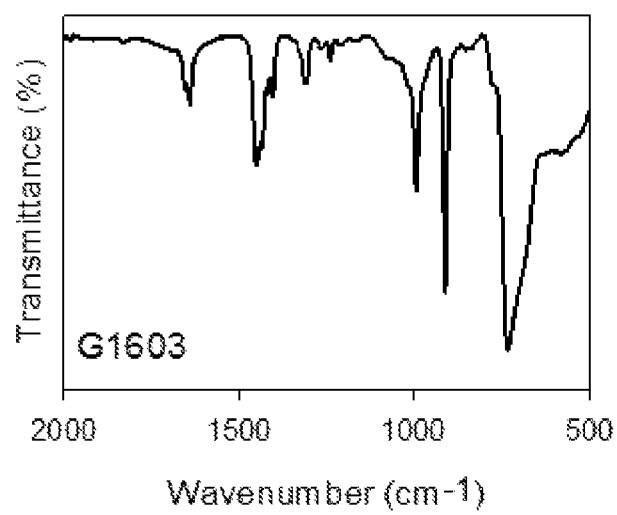
FIG. 27: FT-IR spectrum of the polybutadiene [named sample G1603] described in Example 27.

FIG. 27 shows the FT-IR spectrum of the polybutadiene obtained.

Example 28 (G1604)

2 ml of 1,3-butadiene equal to about 1.4 g were condensed, cold (−20° C.) in a 25 ml test tube. Subsequently, 7.0 ml of toluene were added and the temperature of the solution thus obtained was brought to 25° C. Then, methylaluminoxane (MAO) in toluene solution (6.3 ml; $1 \times 10^{-2}$ moles, equal to about 0.58 g) was added and, subsequently, the $TiCl_4(L8)$ complex [sample MG404A] (2.69 ml of toluene suspension at a concentration of 2 mg/ml; $1 \times 10^{-5}$, equal to about 5.4 mg) obtained as described in Example 17. Everything was kept under magnetic stirring, at 25° C., for 120 minutes. The polymerization was then stopped by adding 2 ml of methanol containing some drops of hydrochloric acid (37% by weight aqueous solution). The polymer obtained was then coagulated by adding 40 ml of a methanol solution containing 4% of Irganox® 1076 antioxidant (Ciba) obtaining 0.334 g of polybutadiene having a 1,4-cis unit content of 79%: further characteristics of the procedure and of the polybutadiene obtained are reported in Table 1.

TABLE 1

Polymerization of 1,3-butadiene with catalytic systems comprising titanium complexes

| Example | Time (min) | Yield (g) | Conversion (%) | 1,4-cis (%) | 1.2 | $M_w$ (g × $mol^{-1}$) | $M_w/M_n$ |
|---|---|---|---|---|---|---|---|
| 18 | 60 | 0.74 | 52.8 | 85 | 15 | 101800 | 1.80 |
| 19 | 60 | 0.80 | 57.1 | 86 | 14 | 307603 | 2.21 |
| 20 | 60 | 0.87 | 62.1 | 80 | 20 | 169935 | 2.47 |
| 21 | 60 | 0.82 | 58.6 | 81 | 19 | 165800 | 2.24 |
| 22 | 30 | 0.43 | 30.7 | 73 | 27 | 297465 | 1.90 |
| 23 | 30 | 1.29 | 92.1 | 60 | 40 | 347000 | 1.88 |
| 24 | 60 | 1.12 | 80 | 60 | 43 | 317225 | 1.73 |
| 25 | 120 | 0.68 | 48.6 | 62 | 38 | 180660 | 1.82 |
| 26 | 25 | 0.43 | 30.7 | 76 | 24 | 129650 | 1.90 |
| 27 | 20 | 0.80 | 57.1 | 82 | 18 | 283800 | 2.10 |
| 28 | 120 | 0.33 | 23.9 | 79 | 21 | 305200 | 1.95 |

The invention claimed is:
1. Bis-imine titanium complex having general formula (I):

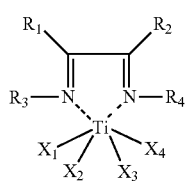

(I)

wherein:
$R_1$ and $R_2$, mutually identical represent a hydrogen atom; or linear or branched, optionally halogenated, $C_1$-$C_{20}$ alkyl groups;
$R_3$ and $R_4$, mutually identical represent phenyl groups optionally substituted with linear or branched $C_1$-$C_{20}$ alkyl groups;
$X_1$, $X_2$, $X_3$ and $X_4$, mutually identical represent at least one halogen atom chlorine, bromine, or iodine;
provided that when $R_1$ and $R_2$ represent a methyl group and $X_1$, $X_2$, $X_3$ and $X_4$ represent a chlorine atom, $R_3$ and $R_4$ are different from 2,6-di-iso-propylphenyl.

2. Catalytic system for the (co)polymerization of conjugated dienes comprising:
(a) at least one bis-imine titanium complex having general formula (I)

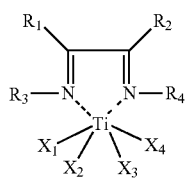

(I)

wherein:
$R_1$ and $R_2$, mutually identical or different, represent a hydrogen atom; linear or branched, optionally halogenated, $C_1$-$C_{20}$ alkyl groups; or optionally substituted cycloalkyl groups;
$R_3$ and $R_4$, mutually identical or different, represent a hydrogen atom; linear or branched, optionally halogenated, $C_1$-$C_{20}$ alkyl groups; optionally substituted cycloalkyl groups; or optionally substituted aryl groups;
$X_1$, $X_2$, $X_3$ and $X_4$, mutually identical or different, represent at least one halogen atom chlorine, bromine, or iodine; linear or branched $C_1$-$C_{20}$ alkyl groups, —OCOR$_5$ groups or —OR$_5$ groups wherein R$_5$ is linear or branched C$_1$-C$_{20}$ alkyl groups; or an acetylacetonate group (acac);

provided that when R$_1$ and R$_2$ represent a methyl group and X$_1$, X$_2$, X$_3$ and X$_4$ represent a chlorine atom, R$_3$ and R$_4$ are different from 2,6-di-iso-propylphenyl;

(b) at least one co-catalyst including organic compounds of an element M' other than carbon, said M' element being at least one of the elements boron, aluminum, zinc, magnesium, gallium, or tin.

3. Catalytic system for the (co)polymerization of conjugated dienes according to claim 2, wherein said co-catalyst (b) is (b$_1$) an aluminum alkyl having general formula (II):

$$Al(X')_n(R_6)_{3-n} \qquad (II)$$

wherein X' represents a halogen atom chlorine, bromine, iodine, or fluorine; R$_6$, mutually identical or different, represent a hydrogen atom, or linear or branched C$_1$-C$_{20}$ alkyl groups, cycloalkyl groups, or aryl groups, said groups being optionally substituted with one or more silicon or germanium atoms; and n is an integer ranging from 0 to 2.

4. Catalytic system for the (co)polymerization of conjugated dienes according to claim 2, wherein said co-catalyst (b) is (b$_2$) organo-oxygenated compounds of an element M' other than carbon being aluminum, gallium, or tin compounds.

5. The catalytic system for the (co)polymerization of conjugated dienes according to claim 2, wherein said co-catalyst (b) is (b$_3$) compounds or mixtures of organometallic compounds of an element M' other than carbon capable of reacting with the bis-imine titanium complex titanium having general formula (I), thereby extracting a σ-linked substituent X$_1$, X$_2$, X$_3$ or X$_4$, to form at least one neutral compound and an ionic compound consisting of a cation containing the metal (Ti) coordinated by the ligand, and an uncoordinating organic anion containing the metal M', whose negative charge is delocalized on a multicentric structure.

6. Catalytic system for the (co)polymerization of conjugated dienes according to claim 3, wherein said aluminum alkyls (b$_1$) having general formula (II) are triethyl-aluminum (TEA), tri-n-propyl aluminum, tri-iso-butyl aluminum (TIBA), tri-hexyl-aluminum, di-iso-butyl aluminum hydride (DIBAH), or diethyl aluminum chloride (DEAC).

7. Catalytic system for the (co)polymerization of conjugated dienes according to claim 4, wherein said organoxy-genated compounds (b$_2$) are aluminoxanes having general formula (III):

$$(R_7)_2—Al—O—[—Al(R_8)—O—]_p—Al—(R_9)_2 \qquad (III)$$

wherein R$_7$, R$_8$ and R$_9$, mutually identical or different, represent a hydrogen atom, a halogen atom chlorine, bromine, iodine, or fluorine; or linear or branched C$_1$-C$_{20}$ alkyl groups, cycloalkyl groups, or aryl groups, said groups being optionally substituted with one or more silicon or germanium atoms; and p is an integer ranging from 0 to 1000.

8. Catalytic system for the (co)polymerization of conjugated dienes according to claim 7, wherein said organo-oxygenated compound (b$_2$) is methylaluminoxane (MAO).

9. Catalytic system for the (co)polymerization of conjugated dienes according to claim 5, wherein said compound(s) or mixtures of compounds (b$_3$) are organic aluminum or boron compounds, represented by the following general formulae:

$$[(R_C)_wH_{4-w}]\cdot[B(R_D)_4]^-; B(R_D)_3; Al(R_D)_3; B(R_D)_3Pir;$$
$$[Ph_3C]+\cdot[B(R_D)_4]^-; [(R_C)_3PirH]+\cdot[B(R_D)_4]^-;$$
$$[Li]+\cdot[B(R_D)_4]^-; [Li]+\cdot[Al(R_D)_4]^-;$$

wherein w is an integer ranging from 0 to 3, each R$_C$ group, independently represents an alkyl group or an aryl group having from 1 to 10 carbon atoms and each R$_D$ group represents, independently, a partially or totally fluorinated, aryl group having from 6 to 20 carbon atoms, and Pyr represents an optionally substituted pyrrole radical.

10. Process for the (co)polymerization of conjugated dienes comprising contacting one or more conjugated dienes with the catalytic system according to claim 3 so as to (co)polymerize the one or more conjugated dienes.

11. Process for the (co)polymerization of 1,3-butadiene comprising contacting 1,3-butadiene with the catalytic system according to claim 3 so as to (co)polymerize the 1,3-butadiene.

12. A bis-imine titanium complex having general formula (I) according to claim 1, wherein:

R$_1$ and R$_2$, mutually identical, are a hydrogen atom; or are a methyl group;

R$_3$ and R$_4$, mutually identical, are phenyl groups substituted with one or more methyl, ethyl, iso-propyl, or tert-butyl groups;

X$_1$, X$_2$, X$_3$ and X$_4$, mutually identical, are chlorine.

13. Process for the (co)polymerization of conjugated dienes comprising contacting one or more conjugated dienes with the catalytic system of claim 2 so as to (co)polymerize the one or more conjugated dienes.

* * * * *